US012648022B2

(12) United States Patent
Li et al.

(10) Patent No.: US 12,648,022 B2
(45) Date of Patent: Jun. 2, 2026

(54) CHANNEL LISTENING METHOD AND RELATED APPARATUS

(71) Applicant: HUAWEI TECHNOLOGIES CO., LTD., Shenzhen (CN)

(72) Inventors: Yunbo Li, Shenzhen (CN); Ming Gan, Shenzhen (CN); Yuchen Guo, Shenzhen (CN); Yiqing Li, Shenzhen (CN); Guogang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 18/306,973

(22) Filed: Apr. 25, 2023

(65) Prior Publication Data

US 2023/0262772 A1 Aug. 17, 2023

Related U.S. Application Data

(63) Continuation of application No. PCT/CN2021/128888, filed on Nov. 5, 2021.

(30) Foreign Application Priority Data

Nov. 5, 2020 (CN) .......................... 202011225545.4

(51) Int. Cl.
*H04W 74/0816* (2024.01)
(52) U.S. Cl.
CPC ............................... *H04W 74/0816* (2013.01)
(58) Field of Classification Search
CPC .................................................. H04W 74/0816
See application file for complete search history.

(56) References Cited

U.S. PATENT DOCUMENTS

| | | | |
|---|---|---|---|
| 2014/0362786 A1 | 12/2014 | Kelman et al. | |
| 2016/0043855 A1 | 2/2016 | Seok | |
| 2016/0345362 A1* | 11/2016 | Lee | H04W 74/0816 |
| 2017/0048035 A1 | 2/2017 | Verbin et al. | |

(Continued)

FOREIGN PATENT DOCUMENTS

| | | |
|---|---|---|
| CN | 105101453 A | 11/2015 |
| CN | 106576364 A | 4/2017 |

(Continued)

OTHER PUBLICATIONS

Doc.: IEEE 802.11-20/1062r5, Error Recovery for Non-STR MLD, Mar. 2020, 17 pages.

(Continued)

*Primary Examiner* — Derrick V Rose

(57) ABSTRACT

In a channel listening method, a non-simultaneous transmit and receive multi-link device (NSTR MLD) receives a first response frame on a first link and a second response frame on a second link, wherein an end time of the first response frame is later than an end time of the second response frame, and the first link and the second link belong to a NSTR link pair. The NSTR MLD determines that at least one of the first response frame and the second response frame fails to be received. In response to the determination, the NSTR MLD performs channel listening in a first interframe space after the first response frame ends, wherein a duration of the first interframe space is less than or equal to a duration of a point coordination function interframe space (PIFS).

18 Claims, 14 Drawing Sheets

(56) References Cited

U.S. PATENT DOCUMENTS

| | | | |
|---|---|---|---|
| 2017/0170937 A1 | 6/2017 | Chun et al. | |
| 2018/0284743 A1 | 10/2018 | Cella et al. | |
| 2020/0314920 A1 | 10/2020 | Seok et al. | |
| 2021/0211375 A1* | 7/2021 | Kwon | H04W 72/535 |
| 2023/0141728 A1* | 5/2023 | Seok | H04W 28/06 |
| | | | 370/329 |
| 2023/0284303 A1* | 9/2023 | Ko | H04W 48/12 |
| | | | 370/310 |

FOREIGN PATENT DOCUMENTS

| | | | |
|---|---|---|---|
| CN | 106922034 A | 7/2017 | |
| CN | 106937403 A | 7/2017 | |
| JP | 2019500801 A | 1/2019 | |
| RU | 2696297 C1 | 8/2019 | |
| WO | 2022095949 A1 | 5/2022 | |

OTHER PUBLICATIONS

IEEE 802.11-20/1278r0, Yongho Seok et al, Error Recovery in Synchronous Multiple Frame Transmission, Sep. 2020, 11 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

IEEE P802.11be/D0.1, Sep. 2020, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), 299 pages.

Yunbo Li et al, Error Recovery for Non-STR MLD, IEEE 802.11-20/1062r0, Dec. 7, 2020, total 17 pages.

Masahiro Takagi et al:"Requirements for MAC/ PHY Simulation Interface", IEEE 802.11-04/219r0, Mar. 2004, total 15 pages.

Yongho Seok et al:"Error Recovery in Synchronous Multiple Frame Transmission." doc.: IEEE 802.11-20/1278r0. Oct. 20, 2020. total 11 pages.

* cited by examiner

| L-STF | L-LTF | L-SIG | RL-SIG | HE-SIG-A | HE-STF | HE-LTF | ... | HE-LTF | DATA | PE |
|-------|-------|-------|--------|----------|--------|--------|-----|--------|------|-----|

A first STA in a NSTR MLD transmits a first frame on a first link, and a second STA in the NSTR MLD transmits a second frame on a second link

1102

The NSTR MLD determines a frame that fails to be transmitted

1103

The NSTR MLD performs channel listening

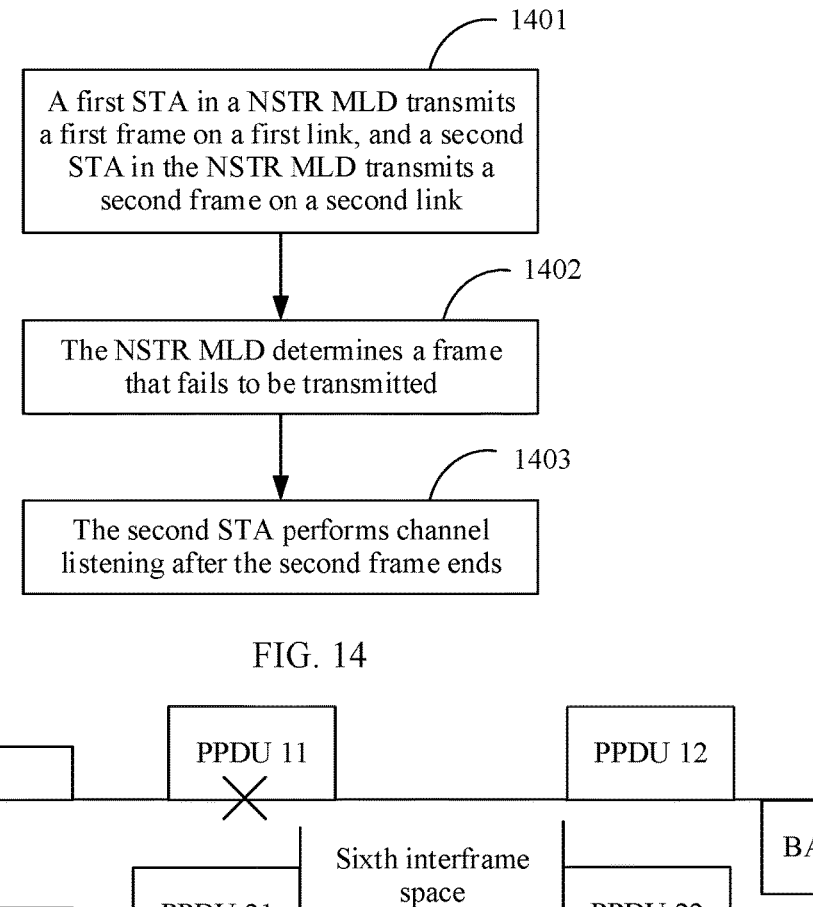
A first STA in a NSTR MLD transmits a first frame on a first link, and a second STA in the NSTR MLD transmits a second frame on a second link — 1401
The NSTR MLD determines a frame that fails to be transmitted — 1402
The second STA performs channel listening after the second frame ends — 1403
FIG. 14
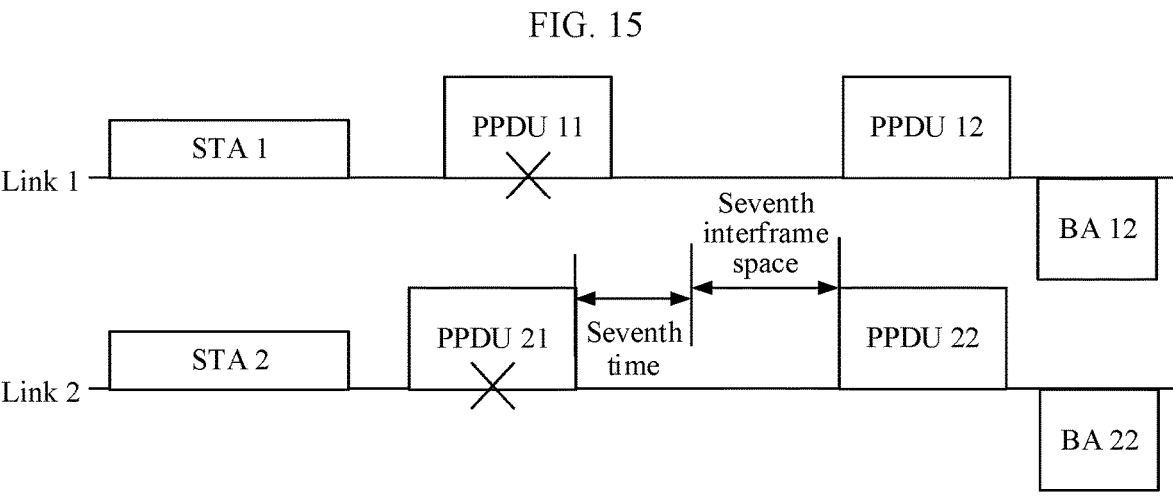
FIG. 15
FIG. 16

CHANNEL LISTENING METHOD AND RELATED APPARATUS

CROSS-REFERENCE TO RELATED APPLICATIONS

This application is a continuation of International Application PCT/CN2021/128888, filed on Nov. 5, 2021, which claims priority to Chinese Patent Application 202011225545.4, filed on Nov. 5, 2020. The disclosures of the aforementioned applications are hereby incorporated by reference in their entirety.

TECHNICAL FIELD

This application relates to the field of communication technologies, and in particular, to a channel listening method and a related apparatus.

BACKGROUND

Institute of Electrical and Electronics Engineers (IEEE) 802.11 series standards are used for a wireless local area network (WLAN), which is usually referred to as a wireless fidelity (Wi-Fi) communication network. Currently, 802.11be has defined a multi-link device (MLD), that is, a device that supports multi-link communication. There is a plurality of access points (APs) or stations (STAs) in each MLD device, to form an AP MLD or a STA MLD. Communication between MLDs is multi-link communication.

802.11be defines that a multi-link device has a simultaneous transmit and receive (STR) capability, or a non-simultaneous transmit and receive (NSTR) capability. Depending on whether the MLD has the STR capability on different links, the MLD may be classified into a STR MLD and a non-STR MLD. One link may be a spatial path through which the MLD performs data transmission in one frequency band. The STR MLD has the STR capability, and the NSTR MLD does not have the STR capability.

A MLD may operate on two or more links. After a physical layer protocol data unit (PPDU) is transmitted on one link, the transmitted PPDU affects channel listening on another link. Therefore, the other link cannot transmit the PPDU. To avoid mutual interference between links, a new channel listening method needs to be provided, so that the NSTR MLD can synchronize multi-link communication.

SUMMARY

Embodiments of this application provide a channel listening method and a related apparatus. Channel listening time is adjusted to avoid impact of a sending action of another link on a channel listening result, to implement link error recovery in a scenario in which a non-simultaneous transmit and receive device NSTR MLD is used in communication.

According to a first aspect, an embodiment of this application provides a channel listening method, applied to a non-simultaneous transmit and receive multi-link device NSTR MLD. The method includes the following.

After sending a PPDU, a station of the NSTR MLD performs channel listening in an interframe space less than or equal to a PIFS. A value range of a difference between the PIFS and duration for performing channel listening is 0 to 4 microseconds, or 0 to 8 microseconds, or 0 to 9 microseconds, or 0 to 12 microseconds.

For example, it is assumed that the value range of the difference between the PIFS and the duration for performing channel listening is 0 to 4 microseconds (it is assumed that the difference is t, that is, a value range oft is [0, 4]). In other words, a value range of the duration for performing channel listening is [PIFS-4, PIFS]. Descriptions of the value range of the foregoing difference being 0 to 8 microseconds, 0 to 9 microseconds, or 0 to 12 microseconds may be similar, and details are not described herein again.

Alternatively, after receiving a BA, a station of the NSTR MLD performs channel listening in an interframe space less than or equal to a PIFS. A value range of a difference between the PIFS and duration for performing channel listening is 0 to 4 microseconds, or 0 to 8 microseconds, or 0 to 9 microseconds, or 0 to 12 microseconds.

For example, it is assumed that the value range of the difference between the PIFS and the duration for performing channel listening is 0 to 4 microseconds (it is assumed that the difference is t, that is, a value range oft is [0, 4]). In other words, a value range of the duration for performing channel listening is [PIFS-4, PIFS]. Descriptions of the value range of the foregoing difference being 0 to 8 microseconds, 0 to 9 microseconds, or 0 to 12 microseconds may be similar, and details are not described herein again.

Alternatively, after sending a PPDU, a station of the NSTR MLD waits for an interframe space shorter than or equal to a PIFS, and then sends a next PPDU. A value range of a difference between the PIFS and a waiting duration is 0 to 4 microseconds or 0 to 8 microseconds, or 0 to 9 microseconds, or 0 to 12 microseconds.

It may be understood that channel listening is not performed within the foregoing waiting duration.

Alternatively, after receiving a BA, a station of the NSTR MLD waits for an interframe space shorter than or equal to a PIFS, and then sends a next PPDU. A value range of a difference between the PIFS and a waiting duration is 0 to 4 microseconds or 0 to 8 microseconds, or 0 to 9 microseconds, or 0 to 12 microseconds.

It may be understood that channel listening is not performed within the foregoing waiting duration.

Alternatively, after sending a PPDU, a station of the NSTR MLD waits for a certain duration, and then performs channel listening in a certain interframe space. A waiting duration is 0 to 8 microseconds. A sum of the waiting duration and the interframe space is less than or equal to a PIFS.

Alternatively, after receiving a BA, a station of the NSTR MLD waits for a certain duration, and then performs channel listening in a certain interframe space. A waiting duration is 0 to 8 microseconds. A sum of the waiting duration and the interframe space is less than or equal to a PIFS.

Alternatively, after sending a PPDU, a station of the NSTR MLD performs channel listening in an interframe space greater than or equal to an SIFS. A value range of a difference between duration for performing channel listening and the SIFS is 0 to 4 microseconds or 0 to 8 microseconds.

For example, it is assumed that the value range of the difference between the duration for performing channel listening and the SIFS is 0 to 4 microseconds (it is assumed that the difference is t, that is, a value range oft is [0, 4]). In other words, a value range of the duration for performing channel listening is [SIFS, SIFS+4].

Alternatively, after receiving a BA, a station of the NSTR MLD performs channel listening in an interframe space greater than or equal to an SIFS. A difference between duration for performing channel listening and the SIFS is 0 to 4 microseconds or 0 to 8 microseconds.

For example, it is assumed that the value range of the difference between the duration for performing channel listening and the SIFS is 0 to 4 microseconds (it is assumed that the difference is t, that is, a value range of t is [0, 4]). In other words, a value range of the duration for performing channel listening is [SIFS, SIFS+4].

Alternatively, after sending a PPDU, a station of the NSTR MLD sends a next PPDU after a waiting duration greater than or equal to an interframe space of an SIFS. A difference between the waiting duration and the SIFS is 0 to 4 microseconds or 0 to 8 microseconds.

It may be understood that channel listening is not performed within the foregoing waiting duration.

Alternatively, after receiving a BA, a station of the NSTR MLD sends a next PPDU after a waiting duration greater than or equal to an interframe space of an SIFS. A difference between the waiting duration and the SIFS is 0 to 4 microseconds 0 to 8 microseconds.

It may be understood that channel listening is not performed within the foregoing waiting duration.

Alternatively, after sending the PPDU, a station of the NSTR MLD waits for a certain duration, and then performs channel listening in an interframe space greater than or equal to an SIFS. The waiting duration is 0 to 8 microseconds.

Alternatively, after receiving a BA, a station of the NSTR MLD waits for a certain duration, and then performs channel listening in an interframe space greater than or equal to an SIFS. The waiting duration is 0 to 8 microseconds.

Based on the first aspect, in a possible design of the first aspect, an embodiment of this application provides a channel listening method, applied to a non-simultaneous transmit and receive multi-link device NSTR MLD. The method includes: The non-simultaneous transmit and receive multi-link device includes a first station STA and a second station STA. The first STA transmits a first frame on a first link. The second STA transmits a second frame on a second link. The first frame is an acknowledgment block BA. The second frame is a BA. An end time of the first frame is later than an end time of the second frame. The NSTR MLD determines that at least one of the first frame and the second frame fails to be transmitted. The first STA performs channel listening in a first interframe space after the first frame ends. Duration of the first interframe space is less than or equal to duration of a point coordination function interframe space PIFS. Alternatively, the second STA performs channel listening in a second interframe space after the second frame ends. Duration of the second interframe space is greater than or equal to duration of a short interframe space (SIFS) and less than or equal to the duration of the PIFS.

Specifically, in this embodiment of this application, the BA may be understood as a reply frame. In addition, the reply frame may further include an acknowledgment (acknowledgement, ACK). The BA in this application may also be replaced with the ACK. In other words, the BA in this application represents only the reply frame. The reply frame does not necessarily need to be the BA, and may also be the ACK. The reply frame may also be a frame of another type. This is not limited herein.

In this embodiment of this application, after receiving an incorrect reply frame (a BA or an ACK), the NSTR MLD may adjust channel listening time, to prevent a sending action on another link from affecting a channel listening result. In addition, an interframe space meets a communication requirement.

Based on the first aspect, in a possible design of the first aspect, the non-simultaneous transmit and receive multi-link device includes a first station STA and a second station STA. The first STA transmits the first frame on the first link. The second STA transmits the second frame on the second link. The first frame is the acknowledgment block BA. The second frame is the BA. The end time of the first frame is later than the end time of the second frame.

The NSTR MLD determines that at least one of the first frame and the second frame fails to be transmitted.

The first STA performs channel listening in the first interframe space after the first frame ends, where the duration of the first interframe space is less than or equal to the duration of the point coordination function interframe space PIFS.

Based on the first aspect, in a possible design of the first aspect, the non-simultaneous transmit and receive multi-link device includes a first station STA and a second station STA. The first STA transmits the first frame on the first link. The second STA transmits the second frame on the second link. The first frame is the acknowledgment block BA. The second frame is the BA. The end time of the first frame is later than the end time of the second frame.

The NSTR MLD determines that at least one of the first frame and the second frame fails to be transmitted.

The second STA performs channel listening in the second interframe space after the second frame ends, where the duration of the second interframe space is greater than or equal to the duration of the short interframe space (SIFS) and less than or equal to the duration of the PIFS.

Based on the first aspect, in a possible design of the first aspect, the non-simultaneous transmit and receive multi-link device includes a first station STA and a second station STA. The first STA transmits the first frame on the first link. The second STA transmits the second frame on the second link. The first frame is the acknowledgment block BA. The second frame is the BA. The end time of the first frame is later than the end time of the second frame.

The NSTR MLD determines that at least one of the first frame and the second frame fails to be transmitted.

The first STA performs channel listening in the first interframe space after the first frame ends, where the duration of the first interframe space is less than or equal to the duration of the point coordination function interframe space PIFS. The second STA performs channel listening in the second interframe space after the second frame ends, where the duration of the second interframe space is greater than or equal to the duration of the short interframe space (SIFS) and less than or equal to the duration of the PIFS.

Based on the first aspect, in a possible design of the first aspect, when the first frame fails to be transmitted, the duration of the first interframe space is a difference between the PIFS and first time.

A value range of the first time may be 0 to 4 microseconds, or 0 to 8 microseconds.

Optionally, the value range of the first time may be 0 to 9 microseconds, or 0 to 12 microseconds.

Based on the first aspect, in a possible design of the first aspect, when the second frame fails to be transmitted, the duration of the first interframe space is the difference between the PIFS and the first time.

The value range of the first time may be 0 to 4 microseconds. It should be noted that when the value range of the first time is 0 to 4 microseconds, a next frame (for example, a PPDU) sent by the first STA may be prevented from interfering with the second STA, and listening difficulty may not be increased.

Optionally, the value range of the first time may alternatively be 0 to 8 microseconds. When the value range of the first time is 0 to 8 microseconds, the next frame (for example, the PPDU) sent by the first STA may be prevented from interfering with the second STA. In addition, it can be ensured that the next frame (for example, the PPDU) sent by the first STA is aligned with a next frame (for example, a PPDU) sent by the second STA. In addition, listening difficulty may not be increased.

Optionally, the value range of the first time may alternatively be 0 to 9 microseconds, or may alternatively be 0 to 12 microseconds.

When the value range of the first time is 0 to 9 microseconds, the next frame (for example, the PPDU) sent by the first STA may be prevented from interfering with the second STA. In addition, it can be ensured that the next frame (for example, the PPDU) sent by the first STA is aligned with a next frame (for example, a PPDU) sent by the second STA. In addition, a requirement that a current interframe space is greater than or equal to the SIFS is met.

When the value range of the first time is 0 to 12 microseconds, 4 µs before the next frame (for example, a PPDU) is sent is transition from a receiving state to a sending state. Therefore, the 4 µs is not used for channel listening. When the second frame is 8 µs earlier than the first frame, channel listening of the first STA is not affected even if an interframe space after the first frame is PIFS-12 (microsecond).

Based on the first aspect, in a possible design of the first aspect, when the first frame fails to be transmitted and the second frame fails to be transmitted, the duration of the first interframe space is the difference between the PIFS and the first time.

The value range of the first time is 0 to 4 microseconds.

Optionally, the value range of the first time may be 0 to 8 microseconds, 0 to 9 microseconds, or 0 to 12 microseconds.

Based on the first aspect, in a possible design of the first aspect, when the first frame fails to be transmitted, duration of the second interframe space is a sum of the short interframe space (SIFS) and second time.

A value range of the second time is 0 to 4 microseconds.

Optionally, the value range of the second time may be 0 to 8 microseconds.

Based on the first aspect, in a possible design of the first aspect, when the second frame fails to be transmitted, the duration of the second interframe space is a sum of the short interframe space (SIFS) and second time.

The value range of the second time is 0 to 4 microseconds or 0 to 8 microseconds.

Based on the first aspect, in a possible design of the first aspect, when the first frame fails to be transmitted and the second frame fails to be transmitted, the duration of the second interframe space is the sum of the short interframe space (SIFS) and the second time.

The value range of the second time is 0 to 4 microseconds or 0 to 8 microseconds.

According to a second aspect, an embodiment of this application provides a channel listening method. The method is applied to a non-simultaneous transmit and receive multi-link device NSTR MLD, and the method includes the following.

The non-simultaneous transmit and receive multi-link device includes a first station STA and a second station STA. The first STA transmits a first frame on a first link. The second STA transmits a second frame on a second link. The first frame is a physical layer protocol data unit PPDU. The second frame is a PPDU. An end time of the first frame is later than an end time of the second frame.

The NSTR MLD determines that the first frame and the second frame fail to be transmitted.

The first STA performs channel listening in a third interframe space after the first frame ends. The third interframe space is less than or equal to duration of a PIFS.

Alternatively, the second STA performs channel listening in a fourth interframe space after the second frame ends. The fourth interframe space is greater than or equal to duration of a short interframe space (SIFS) and less than or equal to the duration of the PIFS.

In this embodiment of this application, after sending an incorrect PPDU, the NSTR MLD may adjust channel listening time, to prevent a sending action on another link from affecting a channel listening result. In addition, an interframe space meets a communication requirement.

Based on the second aspect, in a possible design of the second aspect, the non-simultaneous transmit and receive multi-link device includes the first station STA and the second station STA. The first STA transmits the first frame on the first link. The second STA transmits the second frame on the second link. The first frame is the physical layer protocol data unit PPDU. The second frame is the PPDU. The end time of the first frame is later than the end time of the second frame.

The NSTR MLD determines that the first frame and the second frame fail to be transmitted.

The first STA performs channel listening in a third interframe space after the first frame ends. The third interframe space is less than or equal to duration of a PIFS.

Based on the second aspect, in a possible design of the second aspect, the non-simultaneous transmit and receive multi-link device includes the first station STA and the second station STA. The first STA transmits the first frame on the first link. The second STA transmits the second frame on the second link. The first frame is the physical layer protocol data unit PPDU. The second frame is the PPDU. The end time of the first frame is later than the end time of the second frame.

The NSTR MLD determines that the first frame and the second frame fail to be transmitted.

The second STA performs channel listening in a fourth interframe space after the second frame ends. The fourth interframe space is greater than or equal to duration of a short interframe space (SIFS) and less than or equal to the duration of the PIFS.

Based on the second aspect, in a possible design of the second aspect, the non-simultaneous transmit and receive multi-link device includes the first station STA and the second station STA. The first STA transmits the first frame on the first link. The second STA transmits the second frame on the second link. The first frame is the physical layer protocol data unit PPDU. The second frame is the PPDU. The end time of the first frame is later than the end time of the second frame.

The NSTR MLD determines that the first frame and the second frame fail to be transmitted.

The first STA performs channel listening in the third interframe space after the first frame ends. The third interframe space is less than or equal to the duration of the PIFS.

The second STA performs channel listening in the fourth interframe space after the second frame ends. The fourth interframe space is greater than or equal to the duration of a short interframe space (SIFS) and less than or equal to the duration of the PIFS.

Based on the second aspect, in a possible design of the second aspect, duration of the third interframe space is a difference between the PIFS and the third time.

A value range of the third time is 0 to 4 microseconds, or 0 to 8 microseconds, or 0 to 9 microseconds.

Optionally, the value range of the third time may be 0 to 12 microseconds. Based on the second aspect, in a possible design of the second aspect, duration of the fourth interframe space is a sum of the short interframe space (SIFS) and the fourth time.

A value range of the fourth time is 0 to 4 microseconds or 0 to 8 microseconds.

Based on the second aspect, in a possible design of the second aspect, the second STA performs channel listening in a fifth interframe space after fifth time after the second frame ends. A sum of duration of the fifth interframe and the fifth time is less than or equal to the duration of the PIFS.

Based on the second aspect, in a possible design of the second aspect, a value range of the fifth time is 0 to 8 microseconds.

According to a third aspect, an embodiment of this application provides a channel listening method. The method is applied to a non-simultaneous transmit and receive multi-link device NSTR MLD, and the method includes the following.

The non-simultaneous transmit and receive multi-link device includes a first station STA and a second station STA. The first STA transmits a first frame on a first link. The second STA transmits a second frame on a second link. The first frame is an acknowledgment block physical layer protocol data unit PPDU. The second frame is a PPDU. An end time of the first frame is later than an end time of the second frame.

The second STA performs channel listening in a sixth interframe space after the second frame ends. Duration of the sixth interframe space is a sum of an acknowledgment timeout AckTimeout and sixth time.

Based on the third aspect, in a possible design of the third aspect, a value range of the sixth time is 0 to 4 microseconds.

Based on the third aspect, in a possible design of the third aspect, the method further includes the following.

The second STA performs channel listening in a seventh interframe space after a seventh time after the second frame ends. A sum of the seventh time and the seventh interframe space is equal to the duration of the sixth interframe space.

Based on the third aspect, in a possible design of the third aspect, a value range of the seventh time is 0 to 8 microseconds.

In this embodiment of this application, after sending an incorrect PPDU, the NSTR MLD may adjust the channel listening time, to prevent a sending action on another link from affecting a channel listening result. In addition, an interframe space meets a communication requirement.

According to a fourth aspect, an embodiment of this application provides a method for sending a Multi-User Request to Send (MU-RTS) frame. The method is applied to a transmit MLD, and the method includes the following.

When a station of the transmit MLD sends a MU-RTS, another station of the transmit MLD sends another frame. A value range of a difference between an end time of the MU-RTS and an end time of the other frame is 0 to 4 microseconds. The other frame may be a MU-RTS frame, or may be another frame.

In a possible implementation, the end time of the MU-RTS is later than the end time of the other frame.

In another possible implementation, when the end time of the MU-RTS is earlier than the end time of the other frame, the difference between the end time of the MU-RTS and the end time of the other frame is not limited.

In another possible implementation, the transmit MLD includes a first access point AP and a second AP. The first AP transmits a first multi-user request to send frame (MU-RTS) on a first link.

Based on the fourth aspect, in a possible design of the fourth aspect, the transmit MLD includes the first access point AP and the second AP. The first AP transmits the first multi-user request to send frame (MU-RTS) on the first link. The second AP transmits a second multi-user request to send frame (MU-RTS) on a second link.

A maximum difference between an end time of the first MU-RTS and an end time of the second MU-RTS is 4 microseconds.

For example, the first AP is an AP 1, the second AP is an AP 2, the first link is a link 1, the second link is a link 2, the first MU-RTS is a MU-RTS 1, and the second MU-RTS is a MU-RTS 2. When the maximum difference between the end time of the MU-RTS 1 and the end time of the MU-RTS 2 is 4 microseconds, a maximum difference between a start time of a clear to send (Clear to Send, CTS) frame 1 and a start time of a CTS 2 is also 4 microseconds. Therefore, interference caused by the CTS frame (CTS 1) sent in advance to the other link (link 2) does not affect a channel listening result on the other link. A STA 2 in a receive MLD can normally send the CTS 2.

In this embodiment of this application, a maximum value of a difference between end time of MU-RTSs on different links is limited, to avoid interference between reply frames (CTSs) of the MU-RTSs, and ensure normal sending of the CTSs.

According to a fifth aspect, an embodiment of this application provides a CTS frame sending method. The method is applied to a receive MLD, and the method includes the following.

A time interval at which the receive MLD performs channel listening after receiving a MU-RTS and before sending a CTS is SIFS+T. T is 0 to 4 microseconds or 0 to 8 microseconds.

Based on the fifth aspect, in a possible design of the fifth aspect, the receive MLD includes a first access point STA. The first STA receives a first MU-RTS on a first link.

The first STA sends a first clear to send frame CTS on the first link. A difference between a start time of the first CTS and an end time of the first MU-RTS is an eighth interframe space. Duration of the eighth interframe space is greater than or equal to duration of an SIFS.

In this embodiment of this application, a time interval before the receive MLD sends the CTS is agreed on, to avoid interference between CTSs on different links, and ensure normal sending of the CTSs.

Based on the fifth aspect, in a possible design of the fifth aspect, the duration of the eighth interframe space is a sum of an eighth time and the SIFS. A value range of the eighth time is 0 to 4 microseconds or 0 to 8 microseconds.

Based on the fifth aspect, in a possible design of the fifth aspect, the first STA performs channel listening in the eighth interframe space.

Based on the fifth aspect, in a possible design of the fifth aspect, the receive MLD further includes a second access point STA. The second STA receives a second MU-RTS on a second link. An end time of the second MU-RTS is later than that of the first MU-RTS.

The second STA sends a second clear to send frame CTS on the second link. A difference between a start time of the second CTS and the end time of the second MU-RTS is the SIFS.

According to a sixth aspect, a communication apparatus is provided, to implement the foregoing methods. The communication apparatus may be the NSTR MLD in the first aspect to the third aspect, or an apparatus including the NSTR MLD, or an apparatus included in the NSTR MLD, for example, a system chip. Alternatively, the communication apparatus may be the transmit MLD in the fourth aspect, or an apparatus including the transmit MLD, or an apparatus included in the transmit MLD, for example, a system chip. Alternatively, the communication apparatus may be the receive MLD in the fifth aspect, or an apparatus including the receive MLD, or an apparatus included in the receive MLD, for example, a system chip. The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

According to a seventh aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the NSTR MLD in the first aspect to the third aspect, or an apparatus including the NSTR MLD, or an apparatus included in the NSTR MLD, for example, a system chip. Alternatively, the communication apparatus may be the transmit MLD in the fourth aspect, or an apparatus including the transmit MLD, or an apparatus included in the transmit MLD, for example, a system chip. Alternatively, the communication apparatus may be the receive MLD in the fifth aspect, or an apparatus including the receive MLD, or an apparatus included in the receive MLD, for example, a system chip.

According to an eighth aspect, a communication apparatus is provided. The communication apparatus includes a processor. The processor is configured to: after being coupled to a memory and reading instructions in the memory, perform the method in any one of the foregoing aspects based on the instructions. The memory and the communication apparatus are independent of each other. The communication apparatus may be the NSTR MLD in the first aspect to the third aspect, or an apparatus including the NSTR MLD, or an apparatus included in the NSTR MLD, for example, a system chip. Alternatively, the communication apparatus may be the transmit MLD in the fourth aspect, or an apparatus including the transmit MLD, or an apparatus included in the transmit MLD, for example, a system chip. Alternatively, the communication apparatus may be the receive MLD in the fifth aspect, or an apparatus including the receive MLD, or an apparatus included in the receive MLD, for example, a system chip.

According to a ninth aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the NSTR MLD in the first aspect to the third aspect, or an apparatus including the NSTR MLD, or an apparatus included in the NSTR MLD, for example, a system chip. Alternatively, the communication apparatus may be the transmit MLD in the fourth aspect, or an apparatus including the transmit MLD, or an apparatus included in the transmit MLD, for example, a system chip. Alternatively, the communication apparatus may be the receive MLD in the fifth aspect, or an apparatus including the receive MLD, or an apparatus included in the receive MLD, for example, a system chip.

According to a tenth aspect, a computer program product including instructions is provided. When the instructions are run on a communication apparatus, the communication apparatus is enabled to perform the method according to any one of the foregoing aspects. The communication apparatus may be the NSTR MLD in the first aspect to the third aspect, or an apparatus including the NSTR MLD, or an apparatus included in the NSTR MLD, for example, a system chip. Alternatively, the communication apparatus may be the transmit MLD in the fourth aspect, or an apparatus including the transmit MLD, or an apparatus included in the transmit MLD, for example, a system chip. Alternatively, the communication apparatus may be the receive MLD in the fifth aspect, or an apparatus including the receive MLD, or an apparatus included in the receive MLD, for example, a system chip.

According to an eleventh aspect, a communication apparatus (for example, the communication apparatus may be a chip or a chip system) is provided. The communication apparatus includes a processor, configured to implement a function in any one of the foregoing aspects. In a possible design, the communication apparatus further includes the memory, and the memory is configured to store necessary program instructions and data. When the communication apparatus is a chip system, the communication apparatus may include a chip, or may include a chip and another discrete component.

According to a twelfth aspect, a chip is provided. The chip includes a processor and a communication interface. The communication interface is configured to communicate with a module other than the shown chip. The processor is configured to run a computer program or instructions, so that an apparatus in which the chip is installed can perform the method according to any one of the foregoing aspects.

For technical effects brought by any design in the fifth aspect to the twelfth aspect, refer to technical effects brought by different designs in the first aspect, the second aspect, the third aspect, the fourth aspect, or the fifth aspect. Details are not described herein again.

According to a thirteenth aspect, a communication system is provided. The communication system includes the NSTR MLD, or the transmit MLD, or the receive MLD in the foregoing aspects.

BRIEF DESCRIPTION OF DRAWINGS

Figure 1A:
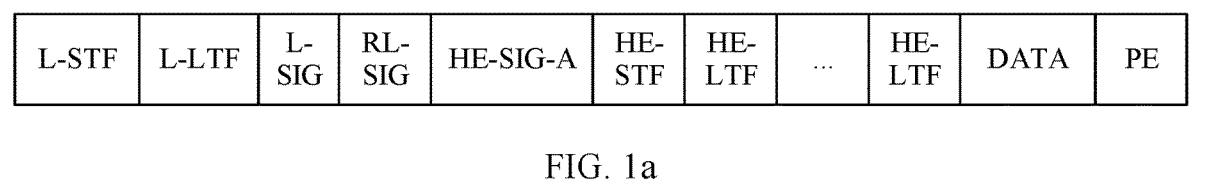

FIG. 1a is a schematic diagram of a structure of a PPDU according to an embodiment of this application;

FIG. 14 is a flowchart of a channel listening method according to an embodiment of this application;

FIG. 15 to FIG. 19 are schematic diagrams of interframe spaces according to an embodiment of this application;

DESCRIPTION OF EMBODIMENTS

Figure 1B:
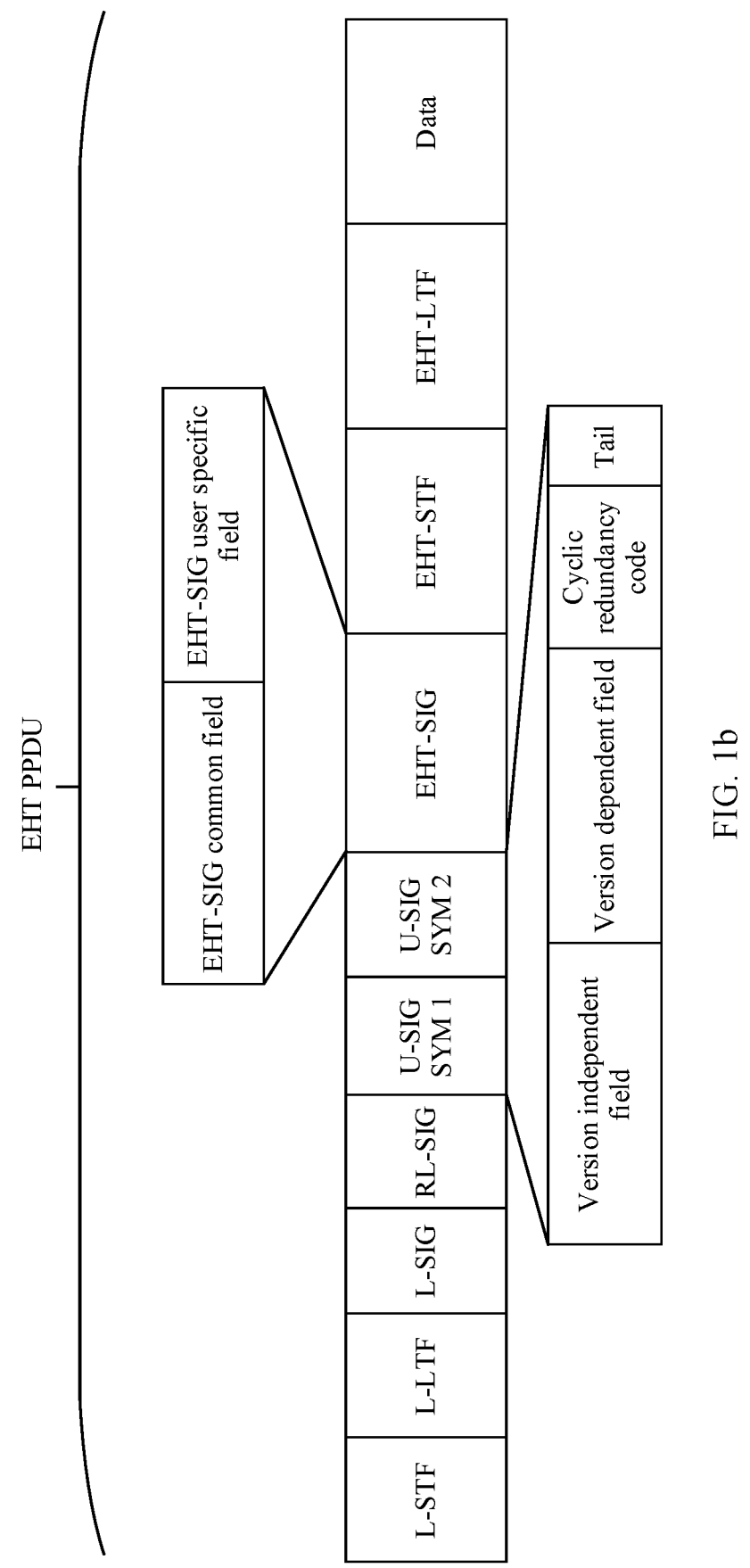
FIG. 1B is a schematic diagram of a structure of another PPDU according to an embodiment of this application.

Embodiments of this application provide a channel listening method and a related apparatus, so that a non-simultaneous transmit and receive multi-link device can synchronize multi-link communication.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following clearly describes the technical solutions in embodiments of this application with reference to the accompanying drawings in embodiments of this application. In descriptions of this application, "/" means "or" unless otherwise specified. For example, AB may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural.

Embodiments of this application may be applied to a wireless local area network (Wireless Local Area Network, WLAN). Currently, a standard used in the WLAN is the Institute of Electrical and Electronics Engineers (Institute of Electrical and Electronics Engineers, IEEE) 802.11 family. The WLAN may include a plurality of basic service sets (Basic Service Set, BSS). A network node in the basic service set is a station (Station, STA). The station includes an access point (AP) type station and a non-access point type station (Non-AP STA). Each basic service set may include one AP and a plurality of non-AP STAs associated with the AP.

The access point station is also referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge that connects the wired network and a wireless network. A main function of the AP is to connect wireless network clients together, and then connect the wireless network to the Ethernet. Specifically, the AP may be a terminal device or a network device with a wireless fidelity (Wi-Fi) chip. Optionally, the AP may be a device that supports the 802.11ad standard or the 802.11ay standard. Optionally, the AP may be a device that supports the 802.11ax standard. Further optionally, the AP may be a device that supports a plurality of WLAN standards such as the 802.11be, the 802.11ac, the 802.11n, the 802.11g, the 802.11b, and the 802.11a. The AP may further support a next-generation 802.11 protocol. This is not limited herein.

A none-access point station (Non-AP STA) may be a wireless communication chip, a wireless sensor, or a wireless communication terminal. For example, the non-AP STA is a mobile phone supporting a Wi-Fi communication function, a tablet computer supporting a Wi-Fi communication function, a set top box supporting a Wi-Fi communication function, a smart TV supporting a Wi-Fi communication function, a smart wearable device supporting a Wi-Fi communication function, an in-vehicle communication device supporting a Wi-Fi communication function, or a computer supporting a Wi-Fi communication function. Specifically, the STA may be a terminal device or a network device with a wireless fidelity chip. Optionally, the station may support the 802.11ax standard. Further optionally, the station supports a plurality of WLAN standards such as the 802.11be, the 802.11ac, the 802.11n, the 802.11g, the 802.11b, and the 802.11a. The STA may further support a next-generation 802.11 protocol. This is not limited herein.

First, for ease of understanding, the following first briefly describes some technical terms in embodiments of this application.

1. Physical Layer Protocol Data Unit (Physical Protocol Data Unit, PPDU)

FIG. 1a is a schematic diagram of a frame structure of a PPDU in the 802.11ax standard. The PPDU includes a legacy short training field (legacy-short training field, L-STF), a legacy long training field (legacy-long training field, L-LTF), a legacy signal field (legacy-signal field, L-SIG), a repeat legacy signal field (repeated legacy-signal field, RL-SIG), a high efficiency signal field A (high efficient-signal field A, HE-SIG A), a high efficiency signal field B (high efficient-signal field B, HE-SIG B), a high efficiency short training field (high efficient-short training field, HE-STF), a high efficiency long training field (high efficient-long training field, HE-LTF), and data (data). Optionally, the PPDU may further include a data packet extension (packet extension, PE).

FIG. 1B shows a structure of an extremely high throughput (extremely high throughput, EHT) PPDU that may be used in the 802.11be. The EHT PPDU may include three parts: a legacy preamble (legacy preamble, L-preamble), a high efficiency preamble (high efficiency preamble, HE-preamble), and a physical layer convergence protocol service data unit (physical layer convergence protocol service data unit, PSDU).

The L-preamble part includes an L-STF field, an L-LTF field, and an L-SIG field. The HE-preamble part includes an RL-SIG field, a universal SIG (U-SIG) field, an extremely high throughput signaling (EHT-SIG) field, an extremely high throughput short training (EHT-STF) field, and an extremely high throughput long training (EHT-LTF) field. The PSDU part includes fields such as a data field. The U-SIG field occupies two OFDM symbols, for example, a U-SIG SYM1 and a U-SIG SYM2 shown in FIG. 1B. The universal (U-SIG) field may include a version independent info field, a version dependent info field, a CRC field, and a tail field. The version independent info field may include a Wi-Fi version field of 3 bits, a downlink/uplink field of 1 bit, a BSS color field of at least 6 bits, and a TXOP field of at least 7 bits. Further, the version independent info field may further include a bandwidth field. The version dependent info field may include a PPDU format field and the like, and may further include one or more of a modulation and coding scheme field, a spatial flow field, an encoding field, and the like. The CRC field occupies at least 4 bits, and the tail field occupies at least 6 bits of the tail bit field.

In a possible implementation, the EHT-SIG field includes an EHT-SIG common field and an EHT-SIG user specific field. The EHT-SIG common field may be used to carry resource allocation information allocated to a STA, and the EHT-SIG user specific field may be used to carry user information.

It should be understood that the EHT-PPDU is merely an example. In a standard formulation process or a technical development process, there may be another structure. This is not limited in this application.

2. Transmission Opportunity (TXOP)

The TXOP is a basic unit in wireless channel access. The TXOP includes an initial time and maximum duration (TXOP limit).

After sending a frame, the device needs to wait for a very short period of time before sending a next frame, to avoid a collision. This period of time is generally referred to as an interframe space (IFS). Currently, the interframe space is usually a short interframe space (short interframe space, SIFS).

Figure 1C:
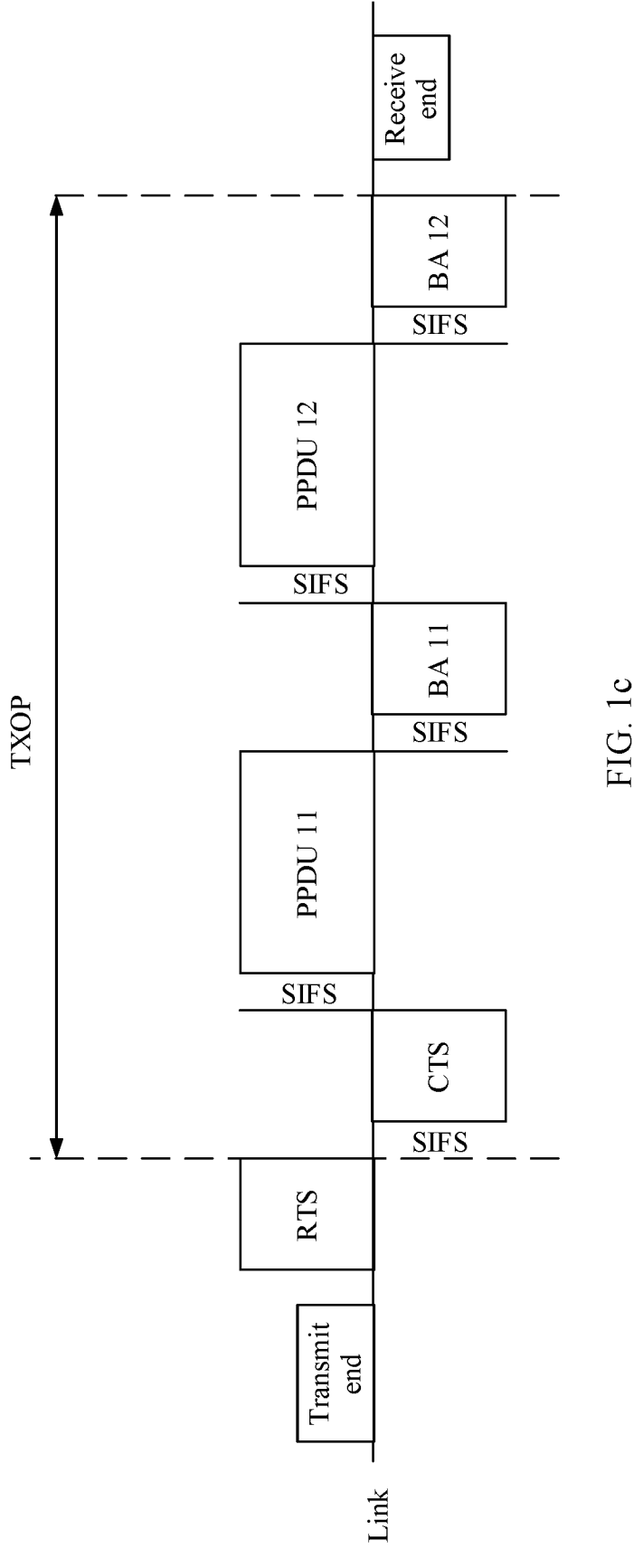
FIG. 1c is a schematic diagram of a structure of a transmission opportunity TXOP according to an embodiment of this application.

For example, the interframe space is the SIFS. FIG. 1c is a schematic diagram of normal transmission of a PPDU in a TXOP. A transmit end device receives a clear to send (CTS) frame, and after the SIFS, the transmit end device starts to send a PPDU 11. Still after the SIFS, the transmit end device receives a BA 11 from a receive end device. The BA 11 is used to feed back to the transmit end whether the PPDU 11 is successfully transmitted. It is assumed that the PPDU 11 is successfully transmitted. The BA 11 frame ends, and after the SIFS the transmit end device continues to send a PPDU 12. The rest may be deduced by analogy.

RTS in FIG. 1c is a request to send (RTS). RTS/CTS is used to solve a hidden site, to avoid a signal collision between multiple sites. Before a transmit end sends a data frame, the transmit end first sends an RTS frame, to indicate the transmit end to send the data frame to a specified receive end within specified duration. After receiving the RTS frame, the CTS frame is replied, to confirm transmission of the transmit end. Another station that receives the RTS frame or the CTS frame does not send a radio frame until the specified duration ends.

3. Error Recovery:

After a transmission opportunity (TXOP) is successfully established, when a PPDU in the TXOP fails to be transmitted, error recovery of a link is triggered.

The error recovery includes point coordination function interframe space (PIFS) error recovery and backoff error recovery. PIFS error recovery: After idle duration of a channel reaches the PIFS, a device sends a next PPDU through the channel. After idle duration of a channel reaches the PIFS, the next PPDU is sent. This is referred to as the PIFS error recovery.

Figure 2:
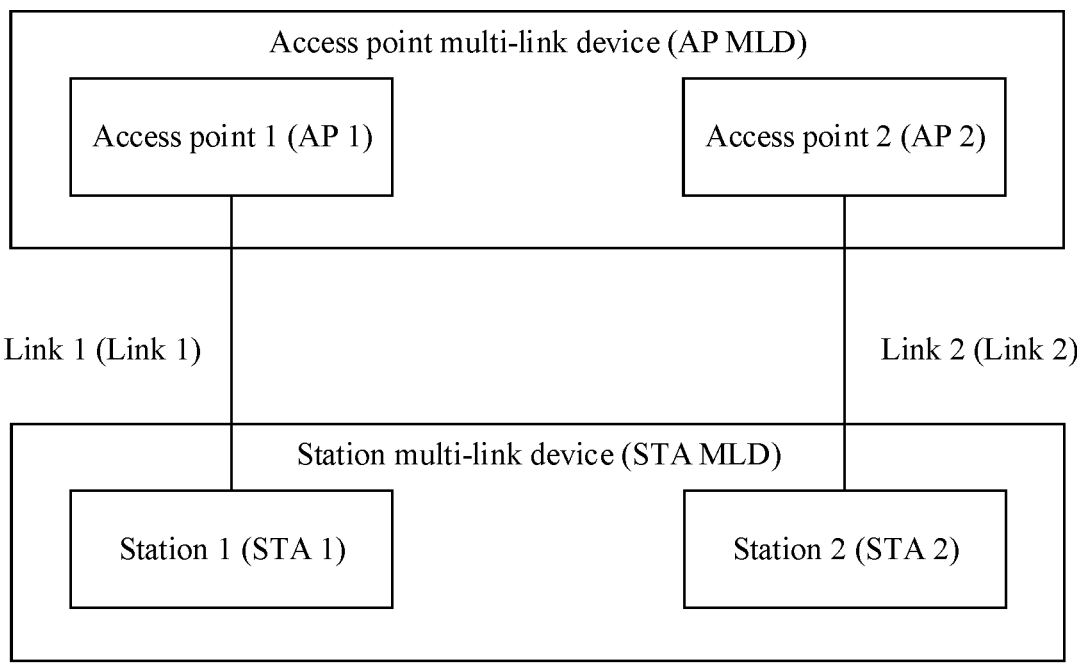
FIG. 2 is a schematic diagram of a communication scenario of a multi-link device according to an embodiment of this application.

In a new-generation standard 802.11be, an extremely high throughput (EHT) is used as a technical objective. One of existing key technologies is multi-link (ML) communication. A core idea of multi-link communication is that a WLAN device that supports the next-generation IEEE 802.11 standard, that is, an EHT device, has a capability of sending and receiving on a plurality of frequency bands, so that a larger bandwidth can be used for transmission. This can further improve a throughput. The multi-band includes but is not limited to a 2.4 GHz Wi-Fi frequency band, a 5 GHz Wi-Fi frequency band, and a 6 GHz Wi-Fi frequency band. Access and transmission performed on each frequency band are referred to as a link (link), and access and transmission performed on a plurality of frequency bands are referred to as multi-link communication. A device supporting multi-link communication is referred to as a multi-link device (Multi-link Device, MLD), and is also referred to as a MLD device. Specifically, FIG. 2 is a schematic diagram of a communication scenario of a multi-link device according to an embodiment of this application. Each MLD device has a plurality of access points (APs) or stations (STAs), and communication between MLDs is multi-link communication. In FIG. 1, a link 1 and a link 2 form a multi-link.

Figure 3:
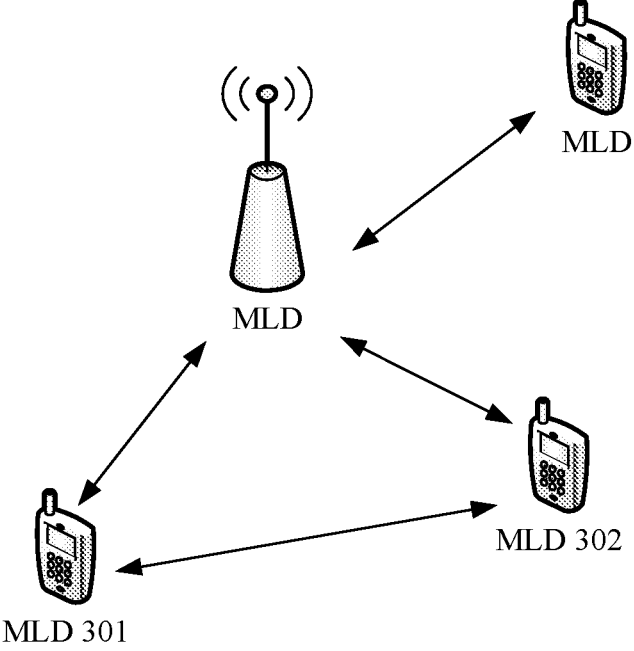
FIG. 3 is a schematic diagram of a communication scenario according to an embodiment of this application.

FIG. 3 is a schematic diagram of a communication scenario according to an embodiment of this application. For example, in this application, MLDs (including a MLD 301 and a MLD 302) have sending and receiving capabilities on a plurality of frequency bands. Compared with a device that supports only single-link transmission, a multi-link device has higher transmission efficiency and a higher throughput. For example, the multiple frequency bands include but are not limited to a 2.4 GHz frequency band, a 5 GHz frequency band, and a 6 GHz frequency band. A spatial path through which the MLD performs data transmission in one frequency band may be referred to as one link. In other words, the MLD supports multi-link communication.

It should be understood that, for the MLD, each link supported by the MLD corresponds to one frequency band.

It should be noted that, in this application, the MLD may also be referred to as a multi-band device (multi-band device), and the two may be interchangeably used. This is not specifically limited in embodiments of this application.

In this application, the MLD includes at least two affiliated stations STAs (affiliated STA). The affiliated station may be an access point station (Access Point Station, AP STA) or a non-access point station (non-Access Point Station, non-AP STA). For ease of description, in this application, a multi-link device whose affiliated station is an AP may be referred to as a multi-link AP, a multi-link AP device, or an AP multi-link device (AP multi-link device, AP MLD). A multi-link device whose affiliated station is a non-AP STA may be referred to as a multi-link STA, a multi-link STA device, a STA multi-link device (STA multi-link device, STA MLD), or a non-AP multilink device (non-AP MLD).

In an implementation, the non-AP STA may implement a function of the AP, or in other words, the non-AP STA can serve as the AP. A non-AP STA that can implement an AP function or an MLD formed by the non-AP MLD that can serve as an AP may be referred to as a soft AP MLD (soft AP MLD).

It may be understood that the AP MLD may be classified into a STR AP MLD and a non-STR AP MLD. The STR AP MLD has a STR capability, and the non-STR AP MLD does not have the STR capability. Similarly, the non-AP MLD can be classified into a STR non-AP MLD and a non-STR non-AP MLD. The STR non-AP MLD has the STR capability, and the non-STR non-AP MLD does not have the STR capability.

In this embodiment of this application, the non-STR AP MLD may include the foregoing soft AP MLD. Certainly, the non-STR AP MLD is not limited to the soft AP MLD.

Figure 4:
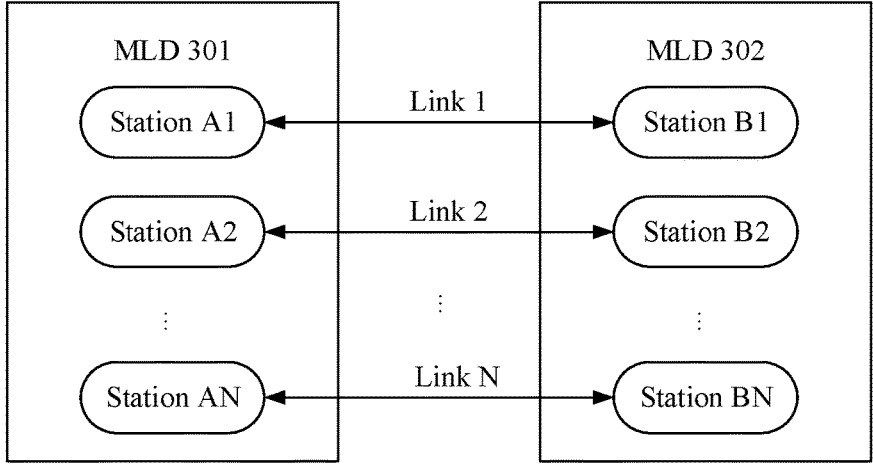
FIG. 4 is a schematic diagram of another communication scenario according to an embodiment of this application.

Each STA in the MLD may establish a link for communication. FIG. 4 uses an example in which a MLD 301 includes a station A1 to a station AN and a MLD includes a station B1 to a station BN. The station A1 communicates with the station B1 on a link 1, a station A2 communicates with a station B2 on a link 2, and so on. The station AN communicates with the station BN on a link N.

The following embodiment of this application describes an example in which a plurality of links between the MLD 301 and a MLD 302 include a first link and a second link.

When frequency spacings between a plurality of frequency bands supported by the MLD device are close, sending a signal on one frequency band affects receiving of a signal on another frequency band. For example, the device sends a signal on the link 1. Because frequency spacings between frequency bands of the link 1 and the link 2 are relatively small, a transmit signal on the link 1 causes channel interference to the link 2, and channel access and reception of the link 2 are affected. Therefore, the MLD device cannot independently perform sending and receiving operations on a plurality of frequency bands at the same time, to avoid mutual interference. 802.11be defines that a multi-link device has a simultaneous transmit and receive (STR) capability, or a non-simultaneous transmit and receive (NSTR) capability. A multilink device with the STR capability is referred to as a STR MLD, and a multilink device without the STR capability is referred to as a NSTR MLD.

It should be noted that one MLD may operate on two or more links, and the STR/NSTR capability of the MLD is for each link pair. Therefore, different link pairs of the same MLD may have different STR/NSTR capabilities. For example, some link pairs are STR, and the other link pairs are NSTR. In this embodiment of this application, the NSTR MLD means that a capability of at least one link pair in link pairs in which the MLD operates is NSTR. Correspondingly, the STR MLD means that all link pairs on which the MLD operates are STR. In this embodiment of this application, the NSTR MLD sends or receives data on the first link and the second link. The first link and the second link are a pair of NSTR links, and the first link and the second link are also referred to as a NSTR link pair.

For the NSTR MLD, due to limited capabilities, when the NSTR MLD transmits a signal on one link, it may not be able to receive a signal on the other link. In other words, when the NSTR MLD sends the signal on one link, if data needs to be received on the other link, the data may not be received. As a result, packet loss occurs.

Therefore, if the NSTR MLD needs to send PPDUs on two links at the same time without interfering with each other, a start time and an end time of the two PPDUs on the two links need to be aligned. According to the current protocol, if a difference between the end time of two PPDUs is less than or equal to 8 microseconds, the end time of the two PPDUs is aligned.

Refer to the foregoing description. When the NSTR MLD simultaneously sends the PPDUs on a NSTR link without causing interference, the end time of the two PPDUs need to be aligned. A maximum (allowed) error of alignment is 8 microseconds, and the 8 microseconds is also referred to as alignment precision. Based on the alignment precision, after the NSTR MLD simultaneously sends the two PPDUs carrying data on the NSTR link (for example, the NSTR link is the first link and the second link), the MLD that receives the PPDU simultaneously replies with an acknowledgment block (Block ACK, BA) on the NSTR link (the first link and the second link). A maximum error of the end time of the PPDUs carrying the two BAs is also 8 microseconds.

The following explains transmission error mentioned in this embodiment of this application. Specifically, the transmission error in this embodiment of this application may include the following two cases:

(1) BA Receiving Error

A receiving error occurs in the BA. To be specific, the BA triggers a physical layer receiving start indication (PHY-RXSTART.indication), and a MAC layer frame check sequence (FCS) of the BA frame fails to check.

(2) PPDU Sending Error

If a sending error occurs in a PPDU, within a specific time after the PPDU ends, a primitive physical layer receiving start indication (PHY-RXSTART.indication) is not triggered for a STA that sends the PPDU.

It should be noted that a transmission error includes a sending error and a receiving error. In this embodiment of this application, a transmission error may also be referred to as a transmission failure (failure). The transmission failure includes a sending failure and a receiving failure. This is not limited herein.

In this embodiment of this application, both a receiving error of the BA and a sending error of the PPDU may be considered as a transmission error, or may be considered as an error frame or a frame that fails to be transmitted. This is not limited in this application. For ease of description, both the receiving error of the BA and the sending error of the PPDU are described as frames that fail to be transmitted.

Figure 5:
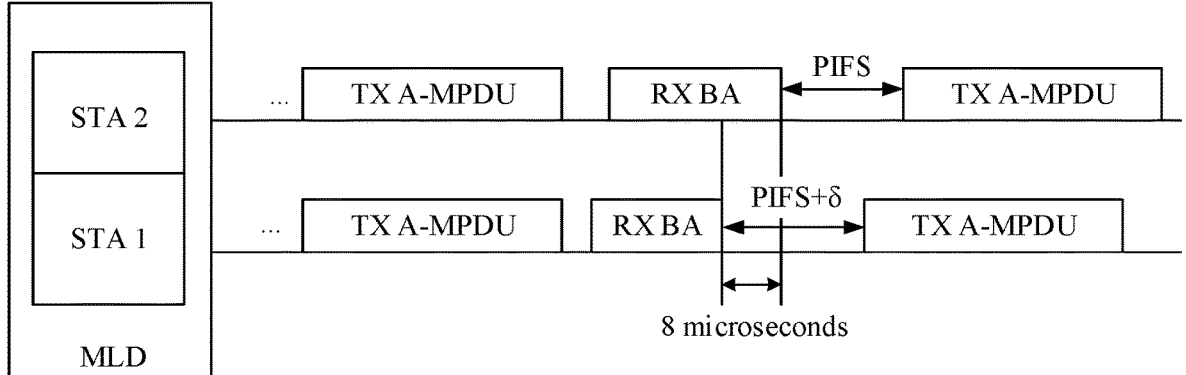
FIG. 5 is a schematic diagram of an interframe space according to an embodiment of this application.

For example, a channel listening process in a case of BA receiving error is used as an example for description. Specifically, as shown in FIG. 5, the STA performs channel listening in a PIFS after the BA ends. The STA (a STA 2 is used as an example) performs channel listening (for example, listening to a channel of a STA 1) within PIFS duration after the BA frame ends, to determine a busy or idle state of the channel. If the STA 2 determines, through channel listening, that the channel is idle, the STA 2 continues to send a next PPDU on a link. If the STA 2 determines, through channel listening, that the channel is busy, the STA 2 stops continuing to send the PPDU on the link.

After receiving the correct BA, the STA also waits for the PIFS before sending the next PPDU. Therefore, a maximum difference between end time of the two BAs is 8 microseconds. After correctly receiving the BA, the STA 1 waits for the PIFS before sending a next PPDU. Due to impact of sending the next PPDU by the STA 1, a channel listening result of the STA 2 is busy.

To resolve the foregoing problem, a solution in the conventional technology provides that: After receiving a correct BA, a STA waits for PIFS+δ before sending a next PPDU, where a time of δ is 0 to 4 microseconds (μs). The STA 1 is used as an example. The next PPDU sent by the STA 1 interferes with only a maximum of the last 4 μs of the PIFS time of the STA 2. The last 4 μs is usually transition from a receiving state to a sending state. Therefore, channel listening is not performed within the time (4 μs), and the channel listening result is not affected.

A current requirement for an interframe space cannot exceed 25 microseconds. Therefore, how to implement synchronous multilink communication of the NSTR MLD is still an urgent problem to be resolved currently.

To resolve the foregoing problem, embodiments of this application provide a channel listening method. For example, a NSTR MLD includes a first station STA and a second STA. The first STA transmits a first frame on a first link. The second STA transmits a second frame on a second link. An end time of the first frame is later than that of the second frame. It should be noted that the NSTR MLD may further include another station, which is not limited herein. The first link and the second link are merely examples, and do not indicate a specific quantity of links. The first link and the second link represent any two of a plurality of links. A solution of this application may be expanded to a case in which there are more than two links. Classification is performed based on types of the first frame and the second frame. The solution provided in this embodiment of this application includes the following steps.

(1) The first frame and the second frame are response frames, for example, acknowledgment blocks (BA). In this case, the first STA receives the first frame (response frame), and the second STA receives the second frame (response frame).

(2). The first frame and the second frame are PPDUs. In this case, the first STA sends the first frame (PPDU), and the second STA sends the second frame (PPDU).

It should be noted that in this embodiment of this application, the BA may be understood as a response frame. In addition, the response frame may further include an acknowledgment (acknowledgement, ACK). The BA in this application may also be replaced with the ACK. In other words, the BA in this application represents only the response frame, and the response frame does not necessarily need to be the BA, and may also be the ACK. The response frame may also be a frame of another type. This is not limited herein.

Figure 6:
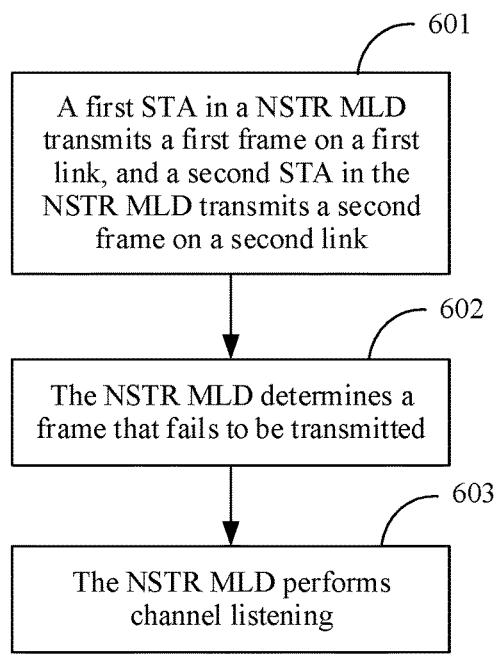
FIG. 6 is a flowchart of a channel listening method according to an embodiment of this application.

First, the following describes a solution in which the first frame and the second frame are the response frames. FIG. 6 is a flowchart of a channel listening method according to an embodiment of this application. The channel listening method provided in this embodiment of this application includes the following steps.

601: A first STA in a NSTR MLD transmits a first frame on a first link, and a second STA in the NSTR MLD transmits a second frame on a second link.

Specifically, in this embodiment, the first STA in the NSTR MLD receives the first frame on the first link, where the first frame is a response frame. The second STA in the NSTR MLD receives the second frame on the second link, where the second frame is a response frame. An end time of the first frame is later than that of the second frame. The following provides description by using an example in which the response frame is a BA.

Figure 7:
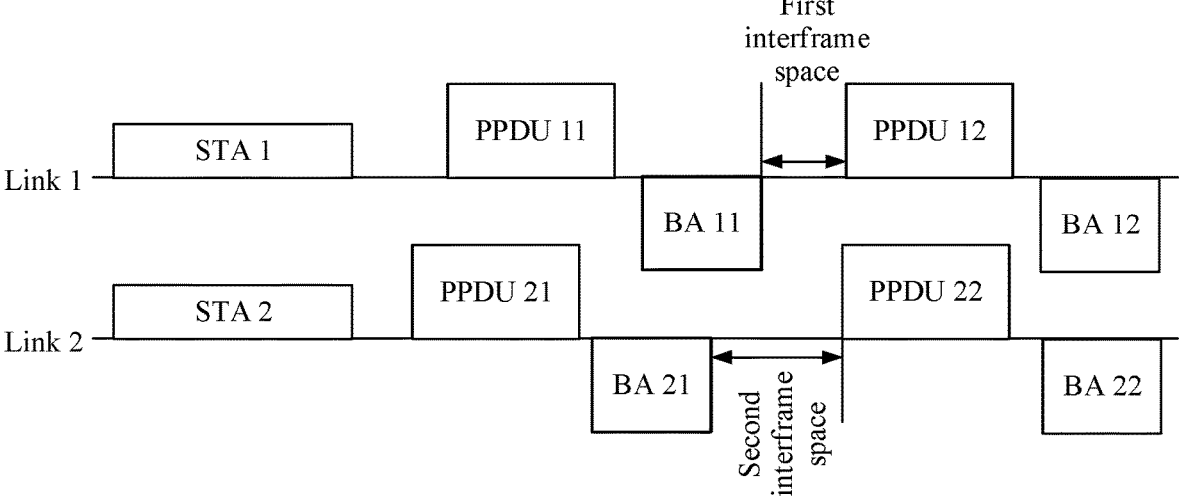
FIG. 7 to FIG. 10 are schematic diagrams of interframe spaces according to an embodiment of this application.

For example, FIG. 7 is a schematic diagram of an interframe space according to an embodiment of this application. The first STA may be understood as a STA 1. The second STA may be understood as a STA 2. The first frame may be understood as a BA 11. The second frame may be understood as a BA 21.

602: The NSTR MLD determines a frame that fails to be transmitted.

In this embodiment, the NSTR MLD determines whether the first frame and the second frame are frames that fail to be transmitted, that is, determines whether the first frame and the second frame fail to be transmitted.

When the first frame is a BA and the second frame is a BA, that the NSTR MLD determines a frame that fails to be transmitted is specifically as follows:

When the NSTR MLD (STA 1) receives the first frame, the first frame triggers a primitive physical layer receiving start indication (PHY-RXSTART.indication). A frame check sequence (FCS) check of a MAC layer of the first frame fails. The NSTR MLD determines that the first frame is the frame that fails to be transmitted.

When the NSTR MLD (STA 2) receives the second frame, the second frame triggers the primitive physical layer receiving start indication (PHY-RXSTART.indication). A frame check sequence (FCS) check of a MAC layer of the second frame fails. The NSTR MLD determines that the second frame is the frame that fails to be transmitted.

When the NSTR MLD (STA 1) receives the first frame, the first frame triggers the primitive PHY-RXSTART.indication, and the frame check sequence (FCS) check of MAC layer of the first frame fails. When the NSTR MLD (STA 2) receives the second frame, the second frame triggers the primitive PHY-RXSTART.indication, and the frame check sequence (FCS) check of the MAC layer of the second frame fails. The NSTR MLD determines that both the first frame and the second frame are frames that fail to be transmitted.

603: The NSTR MLD performs channel listening.

In this embodiment, after the NSTR MLD determines the frame that fails to be transmitted, the first STA performs channel listening in a first interframe space after the first frame ends. Alternatively, after the second frame ends, the second STA performs channel listening in a second interframe space. The following separately describes three cases in which the first frame is the frame that fails to be transmitted, the second frame is the frame that fails to be transmitted, and the first frame and the second frame are the frames that fail to be transmitted.

(1) The First Frame is the Frame that Fails to be Transmitted.

In a possible implementation, the first STA performs channel listening in the first interframe space after the first frame ends. Duration of the first interframe space is a difference between a PIFS and first time. A value range of the first time is 0 to 4 microseconds (if the first time is represented by t, a value range of t is [0, 4]). In other words, a value range of the duration of the first interframe space is [PIFS-4, PIFS]. Alternatively, the value range of the first time is 0 to 8 microseconds.

When the value range of the first time is 0 to 4 microseconds, a next frame (for example, a PPDU) sent by the first STA may be prevented from interfering with the second STA, and a listening difficulty may not be increased.

When the value range of the first time is 0 to 8 microseconds, the next frame (for example, the PPDU) sent by the first STA may be prevented from interfering with the second STA. In addition, it can be ensured that the next frame (for example, the PPDU) sent by the first STA is aligned with a next frame (for example, a PPDU) sent by the second STA. In addition, listening difficulty may not be increased.

Optionally, the value range of the first time may be 0 to 9 microseconds, or 0 to 12 microseconds.

It should be noted that the value range of the first time is 0 to 8 microseconds is used as an example. In other words, the first time in this embodiment of this application may be any value in 0 to 8 microseconds, and the any value may be an integer. For example: 0, 1, 2, 3, 4, 5, 6, 7, or 8 microseconds. The any value may also be a decimal, for example, 0.5, 1.5, 1.8, or 3.4 microseconds. Second time, third time, fourth time, fifth time, sixth time, seventh time, or eighth time in this embodiment of this application is similar to a related definition of the first time, and details are not described below again.

In another possible implementation, the duration of the first interframe space is a short interframe space (SIFS).

In still another possible implementation, the second STA performs channel listening in the second interframe space after the second frame ends. The second interframe space is a sum of a short interframe space (SIFS) and the second time. A value range of the second time is 0 to 4 microseconds or 0 to 8 microseconds.

Figure 8:
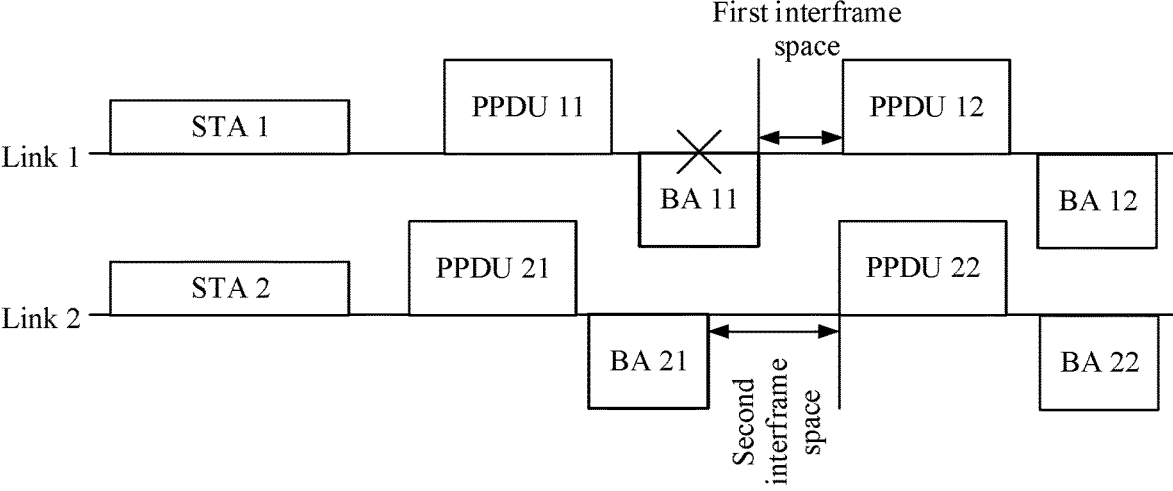

FIG. 8 is a schematic diagram of an interframe space according to an embodiment of this application. The BA 11 is a frame that fails to be transmitted. The following describes a specific implementation of performing channel listening on the NSTR MLD by using an example.

For example, when the STA 1 performs channel listening in the first interframe space after the BA 11 ends, the duration of the first interframe space is a difference between the PIFS and the first time. Correspondingly, the second interframe space of the STA 2 after the BA 21 ends may be a PIFS. Optionally, the STA 2 may perform channel listening in the second interframe space.

For example, when the STA 1 performs channel listening in the first interframe space after the BA 11 ends, the duration of the first interframe space is the short interframe space (SIFS). Correspondingly, the second interframe space of the STA 2 after the BA 21 ends may be a sum of the SIFS and the second time. Optionally, the STA 2 may perform channel listening in the second interframe space.

It should be noted that the foregoing example is merely an example for description, and constitutes no limitation on another implementation of this embodiment of this application.

(2) The Second Frame is a Frame that Fails to be Transmitted.

In a possible implementation, the first STA performs channel listening in the first interframe space after the first frame ends. In this way, a next PPDU is sent only when a channel state is idle, thereby reducing potential collisions. Specifically, the duration of the first interframe space is a difference between the PIFS and the first time. The value range of the first time is 0 to 4 microseconds, or 0 to 8 microseconds, or 0 to 9 microseconds, or 0 to 12 microseconds.

Figure 9:
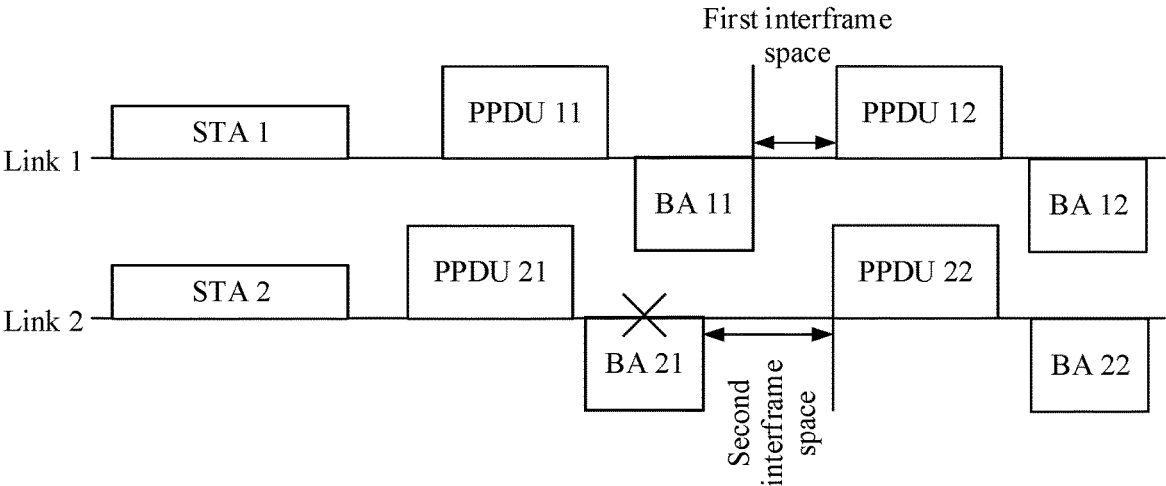

For example, FIG. 9 is a schematic diagram of an interframe space according to an embodiment of this application. When a value range of the first time is 0 to 4 microseconds, interference caused to the STA 2 by sending a next PPDU (PPDU 12) by the STA 1 can be avoided.

When the value range of the first time is 0 to 8 microseconds, the next PPDU (PPDU 12) sent by the STA 1 may be prevented from interfering with the STA 2. In addition, it can be ensured that the PPDU 12 sent by the STA 1 is aligned with a PPDU 22 sent by the STA 2.

When the value range of the first time is 0 to 9 microseconds, the next PPDU (PPDU 12) sent by the STA 1 may be prevented from interfering with the STA 2. In addition, it can be ensured that the PPDU 12 sent by the STA 1 is aligned with the PPDU 22 sent by the STA 2. In addition, a requirement that a current interframe space is greater than or equal to the SIFS is met.

When the value range of the first time is 0 to 12 microseconds, 4 μs before the next PPDU (PPDU 12) is sent is transition from a receiving state to a sending state. Therefore, the 4 μs is not used for channel listening. When the BA 21 is 8 μs earlier than the BA 11, an interframe space PIFS-12 (microsecond) after the BA 11 does not affect channel listening of the STA 1.

In another possible implementation, because the first frame is correctly transmitted, the first STA does not perform channel listening in the first interframe space after the first frame ends. If channel listening is not required at the first interframe space, the next PPDU is directly sent after the first interframe space ends.

In still another possible implementation, the second STA performs channel listening in the second interframe space after the second frame ends. Duration of the second interframe space is a sum of a short interframe space (SIFS) and the second time. The value range of the second time is 0 to 4 microseconds or 0 to 8 microseconds.

Based on the foregoing description, refer to FIG. 9. The BA 21 is a frame that fails to be transmitted. The following describes a specific implementation of performing channel listening on the NSTR MLD by using an example.

For example, the STA 2 performs channel listening in the second interframe space after the BA 21 ends. The duration of the second interframe space is a sum of the short interframe space (SIFS) and the second time. Correspondingly, the first interframe space of the STA 1 after the BA 11 ends is the SIFS. Optionally, the STA 1 performs channel listening in the first interframe space.

For example, the first interframe space after the BA 11 of the STA 1 ends is a difference between the PIFS and the first time. Correspondingly, the STA 2 performs channel listening in the second interframe space after the BA 21 ends. The duration of the second interframe space is the PIFS. Specifically, the STA 1 may directly send a next PPDU without performing channel listening in the first interframe space, or the STA 1 performs channel listening in the first interframe space, and sends the next PPDU only if a channel is idle.

It should be noted that the foregoing example is merely an example for description, and constitutes no limitation on another implementation of this embodiment of this application.

(3) Both the First Frame and the Second Frame are Frames that Fail to be Transmitted.

In a possible implementation, the first STA performs channel listening in the first interframe space after the first frame ends. The duration of the first interframe space is a difference between the PIFS and the first time. The value range of the first time is 0 to 4 microseconds, or 0 to 8 microseconds, or 0 to 9 microseconds, or 0 to 12 microseconds.

In another possible implementation, the second STA performs channel listening in the second interframe space after the second frame ends. The duration of the second interframe space is a sum of the short interframe space (SIFS) and the second time. The value range of the second time is 0 to 4 microseconds or 0 to 8 microseconds.

It should be noted that specific selection of the first time and the second time may be determined by a difference between the end time of the first frame measured by the NSTR MLD and the end time of the second frame measured by the NSTR MLD, or may be preconfigured on the NSTR MLD. This is not limited herein. For example, if the difference between the end time of the first frame and the end time of the second frame measured by the NSTR MLD is 5 microseconds, it may be determined that the value range of the first time is 5 microseconds or the value range of the second time is 5 microseconds.

In another possible implementation, after the second frame ends, the second STA may perform channel listening in the PIFS. After the second frame ends, the second STA may also perform channel listening in an interframe space of another length. This is not limited herein.

Figures 10, 11:
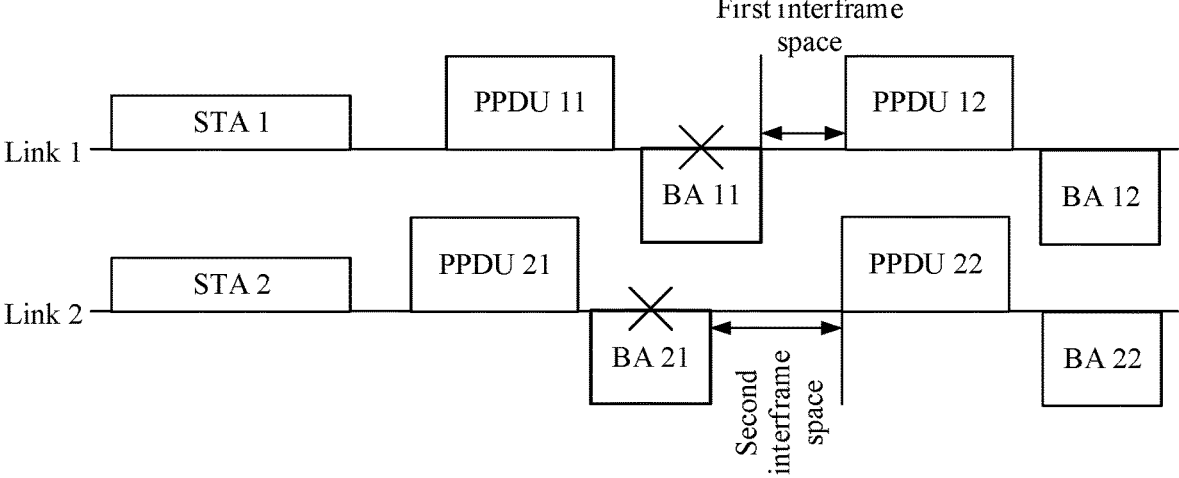
FIG. 11 is a flowchart of a channel listening method according to an embodiment of this application.

Based on the foregoing descriptions, refer to FIG. 10. FIG. 10 is a schematic diagram of an interframe space according to an embodiment of this application. Both the BA 11 and the BA 21 are frames that fail to be transmitted. The following describes a specific implementation of performing channel listening on the NSTR MLD by using an example.

For example, the STA 1 performs channel listening in the first interframe space after the BA 11 ends. The duration of the first interframe space is a difference between the PIFS and the first time. Correspondingly, the STA 2 performs channel listening in the second interframe space after the BA 21 ends. The second interframe space is the PIFS.

For example, the STA 2 performs channel listening in the second interframe space after the BA 21 ends. The duration of the second interframe space is a sum of the short interframe space (SIFS) and the second time. Correspondingly, the STA 1 performs channel listening in the first interframe space after the BA 11 ends. The first interframe space is the SIFS.

It should be noted that the foregoing example is merely an example for description, and constitutes no limitation on another implementation of this embodiment of this application.

Further, after the first frame ends, when a result of channel listening performed by the STA 1 at the first interframe space is that a channel is idle, the STA 1 sends a next PPDU (that is, the PPDU 12) on the first link when the first interframe space ends.

Optionally, if channel listening is not required in the first interframe space, the next PPDU (that is, the PPDU 12) is directly sent after the first interframe space ends.

In this embodiment of this application, after receiving an incorrect response frame (BA or ACK), the NSTR MLD may adjust channel listening time. In this way, a sending action of another link that affects a channel listening result is avoided. In addition, the interframe space meets a communication requirement.

The following describes a solution in which the first frame and the second frame are PPDUs. FIG. 11 is a flowchart of another channel listening method according to an embodiment of this application. The other channel listening method provided in this embodiment of this application includes the following steps.

1101: A first STA in a NSTR MLD transmits a first frame on a first link, and a second STA in the NSTR MLD transmits a second frame on a second link.

In this embodiment, the first STA in the NSTR MLD sends the first frame on the first link, where the first frame is a PPDU. The second STA in the NSTR MLD sends the second frame on the second link, where the second frame is a PPDU. An end time of the first frame is later than that of the second frame.

Figure 12:
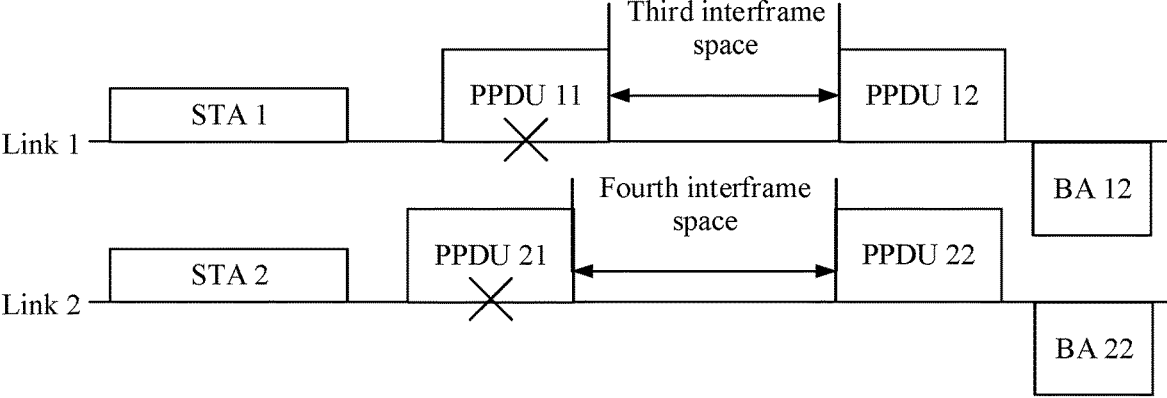
FIG. 12 and FIG. 13 are schematic diagrams of interframe spaces according to an embodiment of this application.

For example, FIG. 12 is a schematic diagram of an interframe space according to an embodiment of this application. The first frame may be illustrated as a PPDU 12, and the second frame may be illustrated as a PPDU 22.

1102: The NSTR MLD determines a frame that fails to be transmitted.

In this embodiment, the NSTR MLD determines whether the first frame and the second frame are frames that fail to be transmitted.

When the first frame is the PPDU 12 and the second frame is the PPDU 22, that the NSTR MLD determines a frame that fails to be transmitted is specifically as follows.

After the NSTR MLD (STA 1) sends the first frame, if the STA 1 is not triggered with a primitive physical layer receiving start indication PHY-RXSTART.indication within specific time of an end of transmission (end of sending) of the first frame, the NSTR MLD determines that the first frame is the frame that fails to be transmitted.

After the NSTR MLD (STA 2) sends the second first frame, if the STA 2 is not triggered with the primitive physical layer receiving start indication PHY-RXSTART.indication within specific time of an end of transmission (end of sending) of the second frame, the NSTR MLD determines that the second first frame is the frame that fails to be transmitted.

After the NSTR MLD determines that both the first frame and the second frame are frames that fail to be transmitted, step 1103 is performed.

1103: The NSTR MLD performs channel listening.

In a possible implementation, the first STA performs channel listening in a third interframe space after the first frame ends. The third interframe space is a difference between a PIFS and third time. A value range of the third time is 0 to 4 microseconds or 0 to 8 microseconds.

In another possible implementation, duration of the third interframe space is a short interframe space (SIFS).

In still another possible implementation, the second STA performs channel listening in a fourth interframe space after the second frame ends. The fourth interframe space is a sum of an SIFS and fourth time. A value range of the fourth time is 0 to 4 microseconds or 0 to 8 microseconds.

Figure 13:
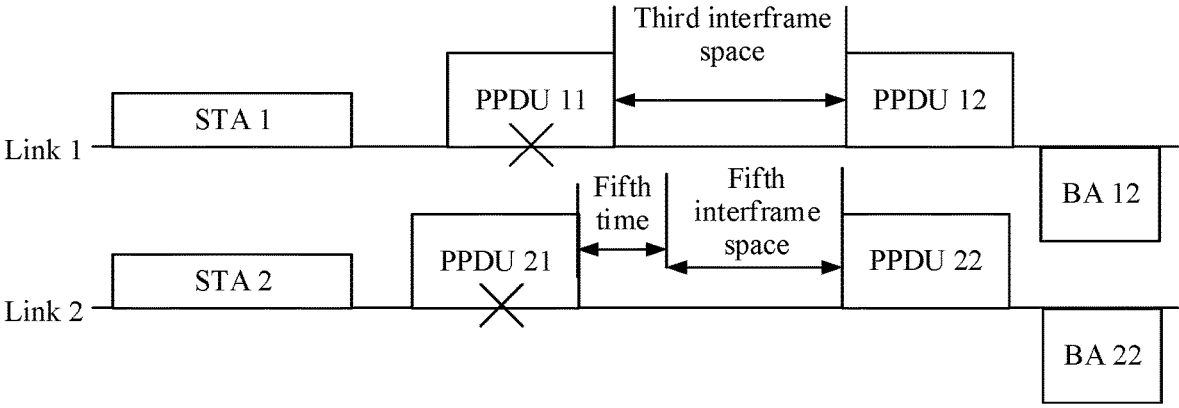

Optionally, after fifth time after the second frame ends, the second STA performs channel listening in a fifth interframe space. A sum of duration of the fifth interframe space and the fifth time is less than or equal to duration of the PIFS. Duration of the fifth time is 0 to 8 microseconds. For example, FIG. 13 is a schematic diagram of an interframe space according to an embodiment of this application. After the PPDU 21 ends, the STA 2 performs channel listening in the fifth interframe space. Details are as follows: The STA 2 first waits for the fifth time (0 to 8 microseconds), and after the fifth time ends, the STA 2 performs channel listening in the fifth interframe space.

Optionally, in the scenario shown in FIG. 13, the STA 1 performs channel listening in the third interframe space after the PPDU 11 ends. For the third interframe space, refer to related descriptions in FIG. 12. Details are not described herein again. Optionally, the STA 1 performs channel listening in the SIFS after the PPDU 11 ends.

Based on the foregoing descriptions, FIG. 12 and FIG. 13 are used as examples. FIG. 12 is a schematic diagram of an interframe space according to an embodiment of this application. The following describes a specific implementation of performing channel listening on the NSTR MLD by using an example.

For example, the STA 1 performs channel listening in the third interframe space after the PPDU 11 ends. Duration of the third interframe space is a difference between the PIFS and the third time. Correspondingly, the STA 2 performs channel listening in the fourth interframe space after the PPDU 21 ends. The fourth interframe space is a PIFS.

For example, the STA 1 performs channel listening in the third interframe space after the PPDU 11 ends. The duration of the third interframe space is the difference between the PIFS and the third time. Correspondingly, after the fifth time after the PPDU 21 ends, the STA 2 performs channel listening in the fifth interframe space. A sum of duration of the fifth interframe space and the fifth time is less than or equal to duration of the PIFS. A value range of the fifth time is 0 to 8 microseconds.

For example, the STA 1 performs channel listening in the third interframe space after the PPDU 11 ends. The duration of the third interframe space is the short interframe space (SIFS). Correspondingly, the STA 2 performs channel listening in the fourth interframe space after the PPDU 21 ends. The fourth interframe space is a sum of the SIFS and the fourth time.

For example, the STA 1 performs channel listening in the third interframe space after the PPDU 11 ends. The duration of the third interframe space is the short interframe space (SIFS). Correspondingly, after the fifth time after the PPDU 21 ends, the STA 2 performs channel listening in the fifth interframe space. The sum of the duration of the fifth interframe space and the fifth time is less than or equal to duration of a sum of the SIFS and the fourth time. The value range of the fifth time is 0 to 8 microseconds.

It should be noted that the foregoing example is merely an example for description, and constitutes no limitation on another implementation of this embodiment of this application.

Further, after the first frame ends, when a result of channel listening performed by the STA 1 at the third interframe space is that a channel is idle, the STA 1 sends a next PPDU (that is, the PPDU 12) on the first link when the third interframe space ends.

After the second frame ends, when a result of channel listening performed by the STA 2 in the fourth interframe space (fifth interframe space) is that the channel is idle, when the fourth interframe space (the fifth interframe space) ends, the STA 2 sends a next PPDU (that is, the PPDU 22) on the second link.

Specific selection of the third time, the fourth time, and the fifth time may be determined by a difference between the end time of the first frame and the end time of the second frame measured by the NSTR MLD, or may be preconfigured on the NSTR MLD. This is not limited herein. For example, if the difference between the end time of the first frame and the end time of the second frame measured by the NSTR MLD is 5 microseconds, it is determined that the value range of the third time is 5 microseconds.

In this embodiment of this application, after sending an incorrect PPDU, the NSTR MLD may adjust the channel listening time, to prevent a sending action on another link from affecting a channel listening result. In addition, an interframe space meets a communication requirement.

Based on the foregoing embodiment shown in FIG. 11 to FIG. 13, in a scenario in which the first frame and the second frame are PPDUs, the following solution is further included. FIG. 14 is a flowchart of a channel listening method according to an embodiment of this application. The channel listening method provided in this embodiment of this application includes the following steps.

1401: A first STA in a NSTR MLD transmits a first frame on a first link, and a second STA in the NSTR MLD transmits a second frame on a second link.

In this embodiment, the first STA in the NSTR MLD sends the first frame on the first link, where the first frame is a PPDU. The second STA in the NSTR MLD sends the second frame on the second link, where the second frame is a PPDU. An end time of the first frame is later than that of the second frame.

For example, FIG. 15 is a schematic diagram of an interframe space according to an embodiment of this application. The first frame may be illustrated as a PPDU 12, and the second frame may be illustrated as a PPDU 22.

1402: The NSTR MLD determines a frame that fails to be transmitted.

In this embodiment, a manner in which the NSTR MLD determines whether the first frame and the second frame are frames failed to be transmitted is the same as the determining manner in the embodiment shown in FIG. 11. Details are not described herein again.

After the NSTR MLD determines that both the first frame and the second frame are frames that fail to be transmitted, step 1403 is performed.

1403: The second STA performs channel listening after the second frame ends.

In this embodiment, in a possible implementation, as shown in FIG. 15, after the second frame (PPDU 21) ends, the STA 2 performs channel listening in a sixth interframe space. Duration of the sixth interframe space is a sum of acknowledgment timeout AckTimeout and sixth time. Optionally, a value range of the sixth time is 0 to 4 microseconds or 0 to 8 microseconds. The sixth interframe space is also referred to as a reserved interframe space.

In another possible implementation, FIG. 16 is a schematic diagram of an interframe space according to an embodiment of this application. The STA 2 performs channel listening in a seventh interframe space after seventh time after the second frame (PPDU 21) ends. A sum of the seventh time and the seventh interframe space is equal to the duration of the sixth interframe space. Optionally, a value range of the seventh time is 0 to 8 microseconds.

In this embodiment of this application, after sending an incorrect PPDU, the NSTR MLD may adjust the channel listening time, to prevent a sending action on another link from affecting a channel listening result. In addition, an interframe space meets a communication requirement.

Using the communication scenario shown in FIG. 3 as an example, a MLD 301 may be used as a transmit MLD, and a MLD 302 may be used as a receive MLD. Multi-user request to send (MU-RTS)/clear to send (CTS) frame interaction is introduced in the 802.11ax standard. By using the MU-RTS/CTS frame interaction, channel protection is implemented between an AP and a plurality of STAs at the same time. A basic procedure is that an AP sends a MU-RTS frame after obtaining a channel through contention. The MU-RTS frame carries an association identifier (AID) of one or more target STAs. After receiving the MU-RTS frame and determining that the target STA is the target STA, the target STA performs channel listening (also referred to as energy detection) in an SIFS after the MU-RTS frame. If a channel listening result is idle, the target STA replies with a CTS frame. If a channel listening result is busy, no CTS frame is replied. It should be noted that when the AP sends the MU-RTS frame to only one STA, if the STA determines, after detecting the MU-RTS frame, that the STA is the target STA, the STA sends the CTS to the AP. In other words, only one STA replies with the CTS.

Figure 17:
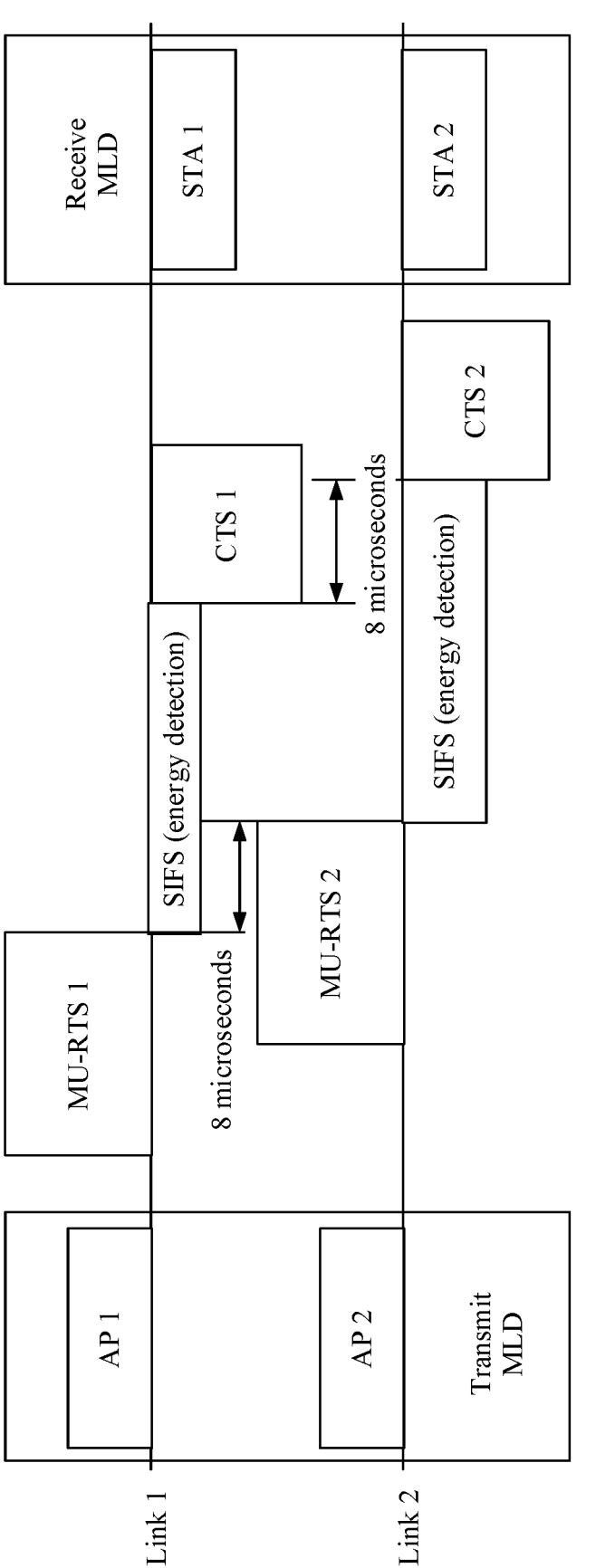

For ease of understanding, refer to FIG. 17. FIG. 17 is a schematic diagram of an interframe space according to an embodiment of this application. It should be noted that a transmit MLD may be an AP MLD. As shown in FIG. 17, the transmit MLD includes an AP 1 and an AP 2, or may be a STA MLD. A receive MLD may be a STA MLD. As shown in FIG. 17, the receive MLD includes a STA 1 and a STA 2, or may be an AP MLD. Based on whether the transmit MLD has a STR capability, the transmit MLD may be a STR MLD. The transmit MLD may also be a NSTR MLD. The receive MLD is a NSTR MLD.

FIG. 17 is used as an example. An AP 1 in the transmit MLD sends a MU-RTS 1 to the receive MLD through a first link (link 1). An AP 2 in the transmit MLD sends a MU-RTS 2 to the receive MLD through a second link (link 2). For the receive MLD, the first link and the second link belong to a NSTR link pair. Therefore, a maximum difference between an end time of the MU-RTS 1 and an end time of the MU-RTS 2 may be 8 microseconds. The end time of the MU-RTS 1 is earlier than the end time of the MU-RTS 2. Correspondingly, when the difference between the end time of the MU-RTS 1 and the end time of the MU-RTS 2 is 8 microseconds, a difference between a start time of a CTS 1 and a start time of a CTS 2 is 8 microseconds. The start time of the CTS 1 is earlier than the start time of the CTS 2.

In a time interval for performing channel listening, the last 4 μs is usually transition from a receiving state to a sending state. Therefore, channel listening is not actually performed within the time (4 μs). Therefore, a channel state of the 4 microseconds does not affect a channel listening result. The 4 microseconds are also referred to as receive-to-transmit transition time (RX/TX time). Therefore, when a difference between the end time of the MU-RTS 1 and the end time of the MU-RTS 2 exceeds 4 microseconds, that the end time of the MU-RTS 1 is earlier than the end time of the MU-RTS 2 is used as an example. In this case, the CTS 1 replied by the receive MLD on the first link (link 1) affects a channel listening result of the STA 2 in the receive MLD. Cross-link interference caused by the CTS 1 makes a result of channel listening performed by the STA 2 be busy. Therefore, the STA 2 cannot send the CTS 2.

Based on this, embodiments of this application provide two solutions to resolve the foregoing problem: (1) A difference between end times at which the transmit MLD sends a MU-RTS is limited. (2) A time interval of channel listening before the receive MLD sends a CTS frame is agreed. Description is given below.
(1) a Difference Between End Time at which the Transmit MLD Sends a MU-RTS is Limited.

An embodiment of this application provides a method for sending a MU-RTS frame. The method is applied to a transmit MLD, and the method includes the following steps.

The transmit MLD includes a first access point AP and a second AP. The first AP transmits a first multi-user request to send frame (MU-RTS) on a first link. The second AP transmits a second multi-user request to send frame (MU-RTS) on a second link.

A maximum difference between an end time of the first MU-RTS and an end time of the second MU-RTS is 4 microseconds.

Figure 18:
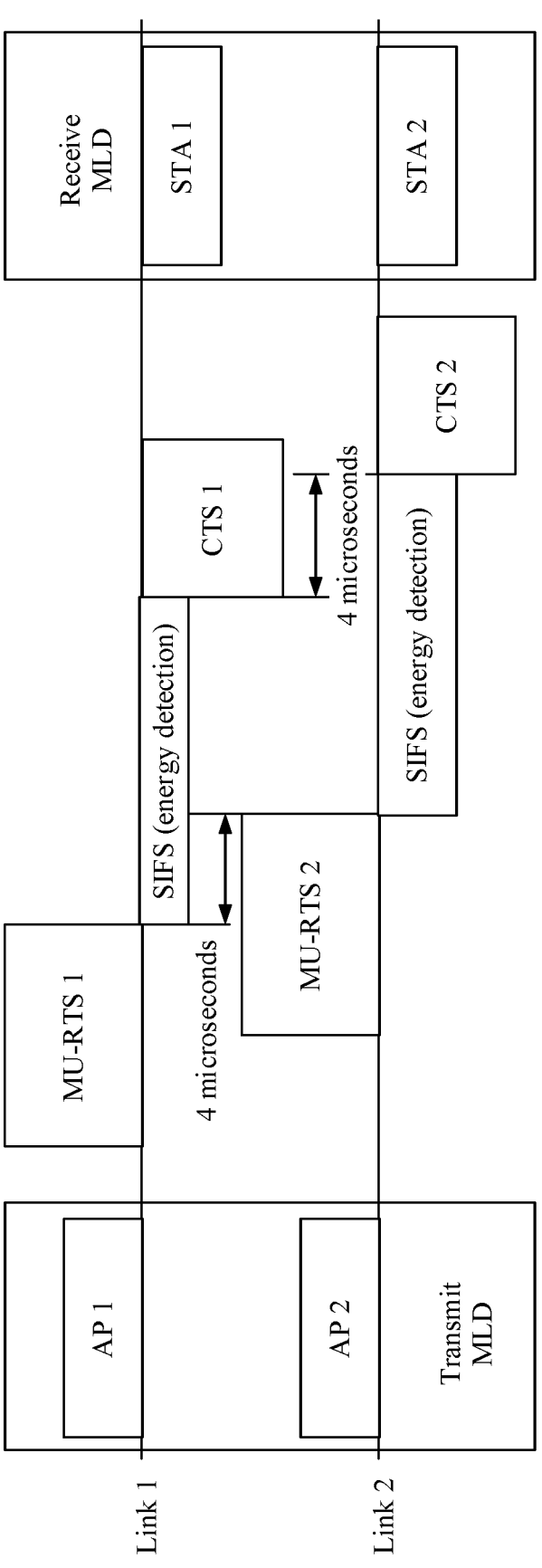

Specifically, FIG. 18 is used as an example. The first AP is an AP 1, the second AP is an AP 2, the first link is a link 1, the second link is a link 2, the first MU-RTS is a MU-RTS 1, and the second MU-RTS is a MU-RTS 2. When a maximum difference between the end time of the MU-RTS 1 and the end time of the MU-RTS 2 is 4 microseconds, a maximum difference between a start time of a CTS 1 and a start time of a CTS 2 is also 4 microseconds. Therefore, interference caused by the CTS frame (CTS 1) sent in advance to the other link (link 2) does not affect a channel listening result on the other link. A STA 2 in a receive MLD can normally send the CTS 2.

In this embodiment of this application, a maximum value of a difference between end time of MU-RTSs on different links is limited, to avoid interference between reply frames (CTSs) of the MU-RTSs, and ensure normal sending of the CTSs.
(2). A Time Interval Before the Receive MLD Sends a CTS Frame is Agreed An embodiment of this application provides a CTS frame sending method. The method is applied to a receive MLD, and the method includes the following.

The receive MLD includes a first access point STA, where the first STA receives a first MU-RTS on a first link;

The first STA sends a first clear to send frame CTS on the first link. A difference between a start time of the first CTS and an end time of the first MU-RTS is an eighth interframe space. Duration of the eighth interframe space is greater than or equal to duration of an SIFS.

In a possible implementation, the duration of the eighth interframe space is a sum of an eighth time and the SIFS. A value range of the eighth time is 0 to 4 microseconds or 0 to 8 microseconds.

In a possible implementation, the first STA performs channel listening in the eighth interframe space.

Based on the fifth aspect, in a possible implementation of the fifth aspect, the receive MLD further includes a second access point STA. The second STA receives a second MU-RTS on a second link. An end time of the second MU-RTS is later than that of the first MU-RTS.

The second STA sends a second clear to send frame CTS on the second link. A difference between a start time of the second CTS and the end time of the second MU-RTS is the SIF S.

Figure 19:
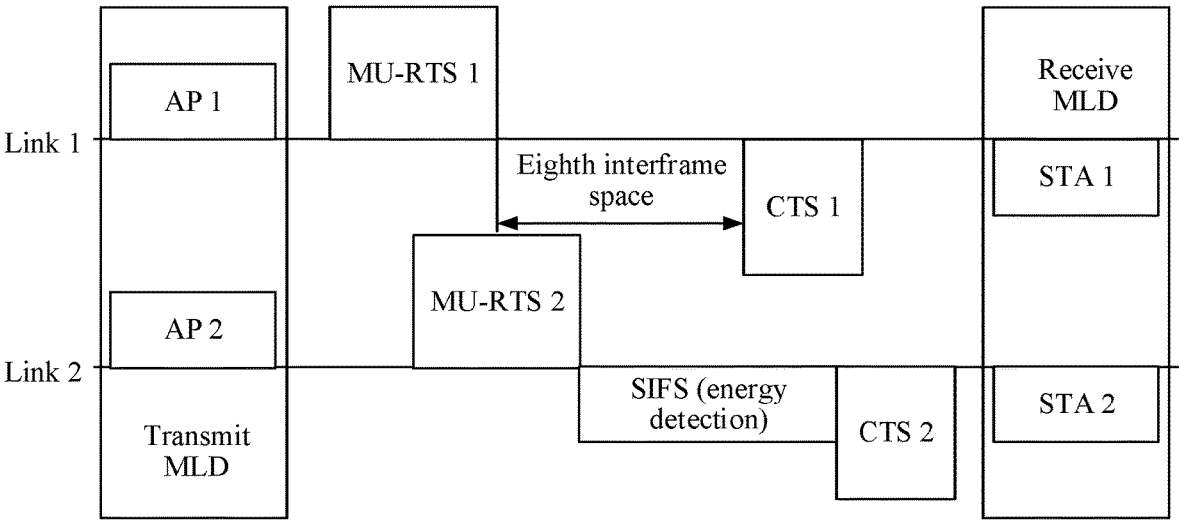

Specifically, using FIG. 19 as an example, the first STA is a STA 1, the second STA is a STA 2, the first link is a link 1, the second link is a link, the first CTS is a CTS 1, and the second CTS is a CTS 2. When the value range of the eighth time is 0 to 4 microseconds, two STAs of the receive MLD may always reduce a sending time alignment error of two CTS frames to within 4 microseconds. Therefore, sending an earlier CTS (CTS 1) does not affect channel listening before sending a later CTS (CTS 2).

When the value range of the eighth time is 0 to 8 microseconds, the two STAs at the receive MLD may always reduce the sending time alignment error of the two CTS frames to 0 microseconds. In this way, not only sending the earlier CTS (CTS 1) does not affect channel listening before sending the later CTS (CTS 2), but also an alignment error of a CTS frame can be reduced as much as possible, so that subsequent PPDUs can be better aligned.

In this embodiment of this application, a time interval before the receive MLD sends the CTS is agreed on, to avoid interference between CTSs on different links, and ensure normal sending of the CTSs.

The foregoing mainly describes the solutions provided in the embodiments of this application. Correspondingly, embodiments of this application further provide a communication apparatus, and the communication apparatus is configured to implement the foregoing various methods. The communication apparatus may be the NSTR MLD in the foregoing method embodiments, or an apparatus including the foregoing NSTR MLD, or an apparatus included in the foregoing NSTR MLD, for example, a system chip. Alternatively, the communication apparatus may be the transmit MLD in the foregoing method embodiments, or an apparatus including the transmit MLD, or an apparatus included in the transmit MLD, for example, a system chip. Alternatively, the communication apparatus may be the receive MLD in the foregoing method embodiments, or an apparatus including the foregoing receive MLD, or an apparatus included in the foregoing receive MLD, for example, a system chip.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 20:
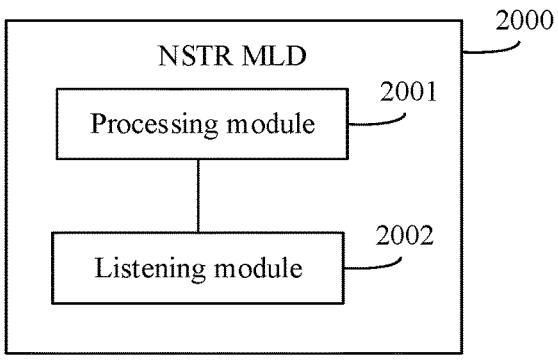
FIG. 20 is a schematic diagram of a structure of a NSTR MLD according to an embodiment of this application.

For example, a communication apparatus is the NSTR MLD in the foregoing method embodiments. FIG. 20 is a schematic diagram of a structure of a NSTR MLD. A NSTR MLD 2000 includes a listening module 2002 and a processing module 2001. The listening module 2002 may also be referred to as a transceiver unit, configured to implement a sending and/or receiving function, for example, may be a transceiver circuit, a transceiver, or a communication interface.

In a possible implementation, the processing module 2001 is configured to determine that at least one of a first frame and a second frame fails to be transmitted.

The listening module 2002 is configured to perform channel listening in a first interframe space after the first frame ends. Duration of the first interframe space is less than or equal to duration of a point coordination function interframe space PIFS.

Alternatively, the listening module 2002 is configured to perform channel listening in a second interframe space after the second frame ends. Duration of the second interframe space is greater than or equal to duration of a short interframe space (SIFS) and less than or equal to the duration of the PIFS.

When the first frame fails to be transmitted, the duration of the first interframe space is a difference between the PIFS and first time.

A value range of the first time is 0 to 4 microseconds.

Optionally, when the second frame fails to be transmitted, the duration of the first interframe space is the difference between the PIFS and the first time.

The value range of the first time is 0 to 4 microseconds, or 0 to 8 microseconds, or 0 to 9 microseconds, or 0 to 12 microseconds.

Optionally, when the first frame and the second frame fail to be transmitted, the duration of the first interframe space is the difference between the PIFS and a first time.

The value range of the first time is 0 to 4 microseconds.

Optionally, when the first frame fails to be transmitted, the duration of the second interframe space is a sum of a short interframe space (SIFS) and second time.

A value range of the second time is 0 to 4 microseconds.

Optionally, when the second frame fails to be transmitted, the duration of the second interframe space is the sum of the short interframe space (SIFS) and the second time.

The value range of the second time is 0 to 4 microseconds or 0 to 8 microseconds.

Optionally, when the first frame and the second frame fail to be transmitted, the duration of the second interframe space is the sum of the short interframe space (SIFS) and a second time.

The value range of the second time is 0 to 4 microseconds or 0 to 8 microseconds.

In another possible implementation, the processing module 2001 is configured to determine that a first physical layer protocol data unit PPDU on a first link fails to be transmitted.

The listening module 2002 is configured to perform channel listening in the first interframe space after the first frame ends. The duration of the first interframe space is less than or equal to the duration of the point coordination function interframe space PIFS.

Alternatively, the second STA performs channel listening in the second interframe space after the second frame ends. The duration of the second interframe space is greater than or equal to duration of a short interframe space (SIFS) and less than or equal to duration of a PIFS.

In still another possible implementation, the processing module 2001 is configured to determine that the first frame and the second frame fail to be transmitted.

The listening module 2002 is configured to perform channel listening in a third interframe space after the first frame ends. The third interframe space is less than or equal to duration of a PIFS.

The listening module is 2002 is further configured to perform channel listening in a fourth interframe space after the second frame ends. The fourth interframe space is less than or equal to the duration of the PIFS.

Optionally, duration of the third interframe space is a difference between the PIFS and third time.

A value range of the third time is 0 to 4 microseconds, or 0 to 8 microseconds, or 0 to 9 microseconds.

Optionally, duration of the fourth interframe space is a sum of the short interframe space (SIFS) and fourth time.

A value range of the fourth time is 0 to 4 microseconds or 0 to 8 microseconds.

Optionally, the listening module 2002 is further configured to perform channel listening in a fifth interframe space after fifth time after the second frame ends. A sum of duration of the fifth interframe space and the fifth time is less than or equal to the duration of the PIFS.

Optionally, a value range of the fifth time is 0 to 8 microseconds.

In still another possible implementation, the processing module 2001 is configured to determine that the first frame and the second frame fail to be transmitted.

The listening module 2002 is configured to perform channel listening in a sixth interframe space after the second frame ends. Duration of the sixth interframe space is a sum of an acknowledgment timeout AckTimeout and sixth time.

Optionally, a value range of the sixth time is 0 to 4 microseconds.

Optionally, the listening module 2002 is further configured to perform channel listening in a seventh interframe space after seventh time after the second frame ends. A sum of the seventh time and the seventh interframe space is equal to the duration of the sixth interframe space.

Optionally, a value range of the seventh time is 0 to 8 microseconds.

All related content of the steps in the foregoing method embodiments may be cited in function descriptions of the corresponding functional modules. Details are not described herein again.

In this embodiment, the NSTR MLD 2000 is presented in a form of obtaining each function module through division in an integrated manner. The module herein may be an ASIC, a circuit, a processor that executes one or more software or firmware programs, a memory, an integrated logic circuit, and/or another component capable of providing the foregoing functions.

The NSTR MLD 2000 provided in this embodiment may perform the foregoing communication method. Therefore, for technical effects that can be achieved by the communication apparatus, refer to the foregoing method embodiments. Details are not described herein again.

Figure 21:
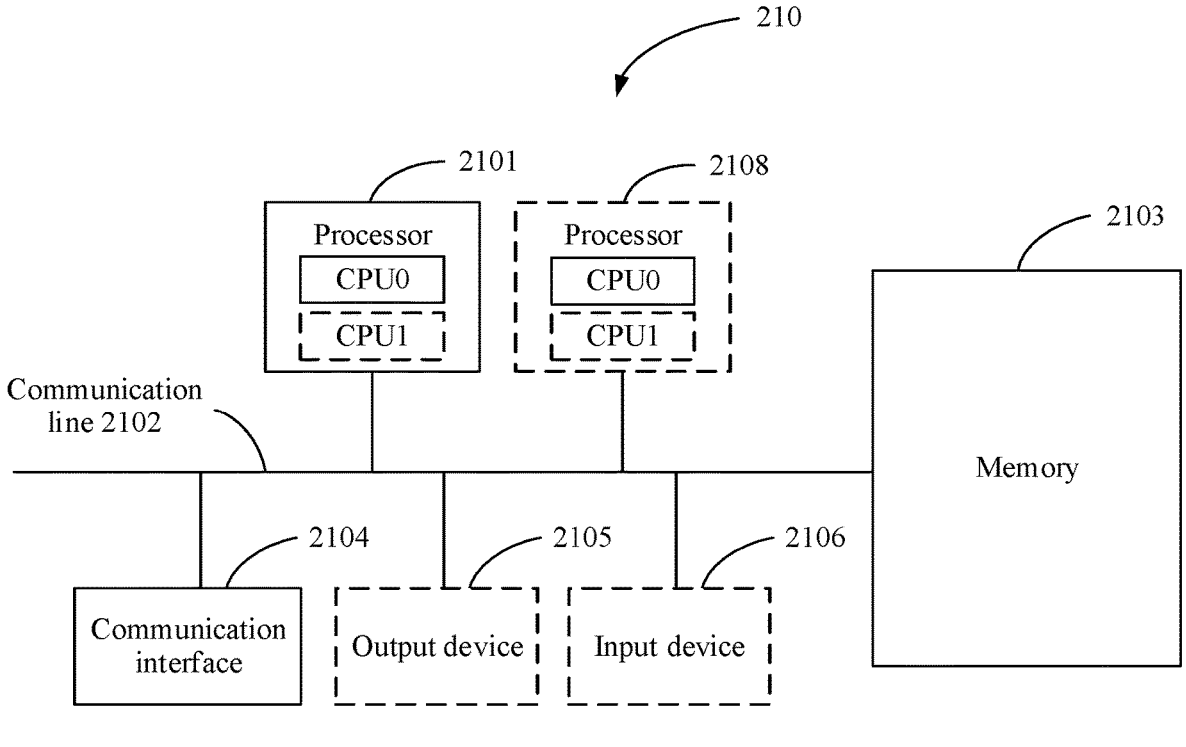
FIG. 21 is a schematic diagram of a structure of a communication device according to an embodiment of this application.

FIG. 21 is a schematic diagram of a hardware structure of a communication device 210 according to an embodiment of this application. The communication device 210 includes at least one processor 2101, a communication line 2102, a memory 2103, and at least one communication interface 2104.

The processor 2101 and a processor 2108 are mainly configured to process a communication protocol and communication data, control the communication device, execute a software program, and process data of the software program. The memory 2103 is mainly configured to store the software program and data. The communication device may further include a control circuit and an antenna (not shown in the figure). The control circuit is mainly configured to perform conversion between a baseband signal and a radio frequency signal and process the radio frequency signal. The antenna is mainly configured to receive and send a radio frequency signal in a form of an electromagnetic wave. An output device 2105 and an input device 2106, for example, a touchscreen, a display screen, or a keyboard, are mainly configured to receive data entered by a user and output data to the user.

After the communication device is powered on, the processor 2101 and the processor 2108 may read the software program in the memory 2103, interpret and execute an instruction of the software program, and process data of the software program. When data needs to be sent in a wireless manner, after performing baseband processing on the to-be-sent data, the processor 2101 and the processor 2108 output a baseband signal to the radio frequency circuit. After performing radio frequency processing on the baseband signal, the radio frequency circuit sends a radio frequency signal in a form of an electromagnetic wave through the antenna. When data is sent to a communication apparatus, the radio frequency circuit receives the radio frequency signal through the antenna, converts the radio frequency signal into a baseband signal, and outputs the baseband signal to the processor 2101 and the processor 2108. The processor 2101 and the processor 2108 convert the baseband signal into data and process the data.

In another implementation, the radio frequency circuit and the antenna may be disposed independent of the processor that performs baseband processing. For example, in a distributed scenario, the radio frequency circuit and the antenna may be separately disposed independent of the communication apparatus.

The NSTR MLD function may be implemented by using the communication device 210. For example, the processor 2101 in FIG. 21 may invoke a computer-executable instruction stored in the memory 2103, so that the communication device 210 performs the method in the foregoing method embodiment.

Specifically, the steps/implementation processes in FIG. 6, FIG. 11, or FIG. 14 may be implemented by the processor 2101 in FIG. 21 by invoking the computer-executable instruction stored in the memory 2103. Alternatively, the processing-related function/implementation process in FIG. 6, FIG. 11, or FIG. 14 may be implemented by the processor 2101 in FIG. 21 by invoking the computer-executable instruction stored in the memory 2103. The receiving and sending-related function/implementation process in FIG. 6, FIG. 11, or FIG. 14 may be implemented by using the communication interface 2104 in FIG. 21.

The processor 2101 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 2102 may include a path for transferring information between the components described above.

The communication interface 2104 is applicable to any apparatus such as a transceiver, and is configured to communicate with another device or a communication network such as Ethernet, a radio access network (radio access network, RAN), or a wireless local area network (wireless local area network, WLAN).

The memory 2103 may be a read-only memory (read-only memory, ROM), another type of static storage device that can store static information and instructions, a random access memory (random access memory, RAM), another type of dynamic storage device that can store information and an instruction, an electrically erasable programmable read-only memory (electrically erasable programmable read-only memory, EEPROM), a compact disc read-only memory (compact disc read-only memory, CD-ROM), another optical disc storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 2102. The memory may alternatively be integrated with the processor.

The memory 2103 is configured to store computer-executable instructions for performing the solutions of this application, and the processor 2101 controls execution. The processor 2101 is configured to execute the computer-executable instruction stored in the memory 2103, to implement a link error recovery method provided in the following embodiments of this application.

All related content of the steps in the foregoing method embodiments may be cited in function descriptions of corresponding components. Details are not described herein again.

Optionally, the computer-executable instructions in this embodiment of this application may also be referred to as application program code. This is not specifically limited in this embodiment of this application.

During specific implementation, in an embodiment, the processor 2101 may include one or more CPUs, for example, a CPU 0 and a CPU 1 shown in FIG. 21.

In a specific implementation, in an embodiment, the communication apparatus 210 may alternatively include a plurality of processors, for example, the processor 2101 and the processor 2108 that are shown in FIG. 21. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication device 210 may further include the output device 2105 and the input device 2106. The output device 2105 communicates with the processor 2101, and may display information in a plurality of manners. For example, the output device 2105 may be a liquid crystal display (LCD), a light emitting diode (LED) display device, a cathode ray tube CRT) display device, a projector, or the like. The input device 2106 communicates with the processor 2101, and may receive user input in a plurality of manners. For example, the input device 2106 may be a mouse, a keyboard, a touchscreen device, or a sensor device.

The communication device 210 may be a general-purpose device or a dedicated device. During specific implementation, the communication device 210 may be a desktop computer, a portable computer, a network server, a palmtop computer (personal digital assistant, PDA), a mobile phone, a tablet computer, a wireless terminal device, an embedded device, or a device with a structure similar to that in FIG. 21. A type of the communication device 210 is not limited in this embodiment of this application.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication device may include a chip, or may include a chip and another discrete component. This is not specifically limited in this embodiment of this application.

In an example, any one of the foregoing communication apparatuses (or modules in the communication apparatus) may be one or more integrated circuits configured to implement the foregoing method, for example, one or more application-specific integrated circuits (ASIC), one or more microprocessors (digital signal processor, DSP), one or more field programmable gate arrays (FPGA), or a combination of at least two of these integrated circuits. For another example, when the module in the apparatus may be implemented by scheduling a program by a processing element, the processing element may be a general-purpose processor, for example, a central processing unit (CPU) or another processor that can invoke the program. For another example, these modules may be integrated together and implemented in a form of a system-on-a-chip (SoC).

An embodiment of this application further provides a chip system, including a memory and a processor. The memory is configured to store a computer program, and the processor is configured to invoke the computer program from the memory and run the computer program, so that a chip performs any implementation shown in the foregoing method embodiments.

An embodiment of this application further provides a chip system, including a processor. The processor is configured to invoke and run a computer program, so that a chip performs any implementation shown in the foregoing method embodiments.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or transmitted from one computer-readable storage medium to another computer-readable storage medium. For example, the computer instructions may be transmitted from a website, computer, terminal apparatus, network apparatus, computing device, or data center to another website, computer, terminal apparatus, network apparatus, computing device, or data center in a wired (for example, a coaxial cable, an optical fiber, or a digital subscriber line (DSL)) or wireless (for example, infrared, radio, or microwave) manner. The computer-readable stor- age medium may be any usable medium that can be stored by a computer, or a data storage device, such as a terminal apparatus, a network apparatus, or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid-State Disk, SSD)), or the like.

It should be understood that "an embodiment" or "one embodiment" mentioned in the entire specification means that particular features, structures, or characteristics related to the embodiment are included in at least one embodiment of this application. Therefore, "in an embodiment" or "in one embodiment" appearing throughout the specification does not necessarily refer to a same embodiment. In addi- tion, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the imple- mentation processes of embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specifi- cation generally indicates an "or" relationship between the associated objects.

It should be understood that in embodiments of this application, "B corresponding to A" indicates that B is associated with A, and B may be determined according to A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the inter- changeability between the hardware and the software, the foregoing has generally described compositions and steps of each example according to functions. Whether the functions are performed by hardware or software depends on particu- lar applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, appa- ratus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, division into the units is merely logical func- tion division and may be other division in actual implemen- tation. For example, a plurality of units or components may be combined or integrated into another system, or some features may be ignored or not performed. In addition, the displayed or discussed mutual couplings or direct couplings or communication connections may be implemented by using some interfaces. The indirect couplings or communi- cation connections between the apparatuses or units may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of embodiments.

In addition, functional modules in this application may be integrated into one processing module, or each of the modules may exist alone physically, or two or more modules are integrated into one module. The integrated module may be implemented in a form of hardware, or may be imple- mented in a form of a software functional module.

When the integrated module is implemented in the form of a software functional module and sold or used as an independent product, the integrated unit may be stored in a computer-readable storage medium. Based on such an understanding, the technical solutions of this application essentially, or a part that makes a contribution to the prior art, or all or a part of the technical solutions may be embodied in a form of a software product. The computer software product is stored in a storage medium and includes several instructions for instructing a computer device (which may be a personal computer, a server, or a network appa- ratus) to perform all or some of the steps of the methods in the embodiments of this application.

In conclusion, the foregoing descriptions are merely examples of embodiments of the technical solutions of this application, but are not intended to limit the protection scope of this application. Any modification, equivalent replace- ment, or improvement made without departing from the principle of this application shall fall within the protection scope of this application.

What is claimed is:

1. A channel listening method performed by a non- simultaneous transmit and receive multi-link device (NSTR MLD), comprising:

receiving a first frame on a first link, wherein the first frame is a response frame;

receiving a second frame on a second link, wherein the second frame is a response frame, and an end time of the first frame is later than an end time of the second frame, wherein the first link and the second link belong to a NSTR link pair;

determining that at least one of the first frame and the second frame fails to be received; and performing channel listening in a first interframe space after the first frame ends, wherein a duration of the first interframe space is grater than or equal to a duration of a short interframe space (SIFS) and less than a duration of a point coordination function interframe space (PIFS).

2. The method according to claim 1, wherein in response to determining that the first frame fails to be received, the step of performing channel listening includes setting a duration of the first interframe space to be a difference between the PIFS and a first time having a value range of the 0 to 4 microseconds.

3. The method according to claim 1, wherein in response to determining that the first frame fails to be received, the step of performing channel listening includes setting a duration of the first interframe space in a value range of [PIFS-4, PIFS].

4. The method according to claim 1, wherein in response to determining that the first frame is correctly received, the step of performing channel listening includes setting a duration of the first interframe space to be a difference between the PIFS and a first time having a value range of 0 to 9 microseconds.

5. The method according to claim 1, further comprising: in response to determining that that the second frame is correctly received, sending a next physical protocol data unit (PPDU) after a second interframe space, wherein a duration of the second interframe space is equal to the duration of the PIFS.

6. The method according to claim 1, further comprising: performing channel listening in a second interframe space after the second frame ends, wherein a duration of the second interframe space is the duration of the PIFS.

7. The method according to claim 1, wherein the step of determining that least one of the first frame and the second frame fails to be transmitted comprises determining that:
   the first frame triggers a physical layer receiving start indication (PHY-RXSTART.indication), and a frame check sequence (FCS) check of a media access control (MAC) layer of the first frame fails;
   the second frame triggers a PHY-RXSTART.indication, and an FCS check of a MAC layer of the second frame fails; or
   the first frame triggers a PHY-RXSTART.indication, an FCS check of a MAC layer of the first frame fails, and the second frame triggers a PHY-RXSTART.indication, and an FCS check of a MAC layer of the second frame fails.

8. A non-simultaneous transmit and receive multi-link device (NSTR MLD) comprising:
   a memory storing executable instructions; and
   a processor configured to execute the executable instructions to:
      receive a first frame on a first link, wherein the first frame is a response frame;
      receive a second frame on a second link, wherein the second frame is a response frame, and an end time of the first frame is later than an end time of the second frame, wherein the first link and the second link belong to a NSTR link pair;
      determine that at least one of the first frame and the second frame fails to be received;
      perform channel listening in a first interframe space after the first frame ends, wherein a duration of the first interframe space is grater than or equal to a duration of a short interframe space (SIFS) and less than a duration of a point coordination function interframe space (PIFS).

9. The NSTR MLD according to claim 8, wherein in response to determining that the first frame fails to be received, the processor is configured to perform the channel listening for a duration of the first interframe space set to be a difference between the PIFS and a first time having a value range of 0 to 4 microseconds.

10. The NSTR MLD according to claim 8, wherein in response determining that the first frame fails to be received, the processor is configured to perform the channel listening for a duration of the first interframe space in a value range of [PIFS-4, PIFS].

11. The NSTR MLD according to claim 8, wherein in response to determining that the first frame is correctly received, the processor is configured to perform the channel listening for a duration of the first interframe space set to be a difference between the PIFS and a first time having a value range of 0 to 9 microseconds.

12. The NSTR MLD according to claim 8, wherein the processor is further configured to:
   send, in response to determining that the second frame is correctly received, a next physical protocol data unit (PPDU) after a second interframe space set to be equal to the duration of the PIFS.

13. The NSTR MLD according to claim 8, wherein the processor is further configured to:
   perform channel listening in a second interframe space after the second frame ends, wherein a duration of the second interframe space is the duration of the PIFS.

14. The NSTR MLD according to claim 8, wherein the processor is configured to determine that at least one of the first frame and the second frame fails to be transmitted by determining that:
   the first frame triggers a physical layer receiving start indication (PHY-RXSTART.indication), and a frame check sequence (FCS) check of a media access control MAC layer of the first frame fails;
   the second frame triggers a PHY-RXSTART.indication, and an FCS check of a MAC layer of the second frame fails; or
   the first frame triggers a PHY-RXSTART.indication, an FCS check of a MAC layer of the first frame fails, and the second frame triggers a PHY-RXSTART.indication, and an FCS check of a MAC layer of the second frame fails.

15. A chip system comprising:
   a memory storing executable instructions; and
   a processor configured to execute the executable instructions to cause a non-simultaneous transmit and receive multi-link device (NSTR MLD) comprising the chip system to:
      receive a first frame on a first link, wherein the first frame is a response frame;
      receive a second frame on a second link, wherein the second frame is a response frame, and an end time of the first frame is later than an end time of the second frame, wherein the first link and the second link belong to a NSTR link pair;
      determine that at least one of the first frame and the second frame fails to be received; and
      perform channel listening in a first interframe space after the first frame ends, wherein duration of the first interframe space is grater than or equal to a duration of a short interframe space (SIFS) and less than duration of a point coordination function interframe space (PIFS).

16. The chip system according to claim 15, wherein in response to determining that the first frame fails to be received, the NSTR MLD is caused to perform channel listening for a duration of the first interframe space set to be a difference between the PIFS and a first time having a value range of 0 to 4 microseconds.

17. The chip system according to claim 15, wherein in response to determining that the first frame fails to be received, the NSTR MLD is caused to perform channel listening for a duration of first interframe space in a value range of [PIFS-4, PIFS].

18. The chip system according to claim 15, wherein in response to determining that the first frame is correctly received, the NSTR MLD is caused to perform channel listening for a duration of the first interframe space set to be a difference between the PIFS and a first time having a value range of 0 to 9 microseconds.

\* \* \* \* \*